(12) United States Patent
Bradley et al.

(10) Patent No.: US 12,416,571 B2
(45) Date of Patent: Sep. 16, 2025

(54) SPECTROMETER WITH ABSOLUTE TRANSMISSION ACCESSORY

(71) Applicant: THERMO ELECTRON SCIENTIFIC INSTRUMENTS LLC, Madison, WI (US)

(72) Inventors: Michael Bradley, Hillsboro, OR (US); Min Yan, Hillsboro, OR (US)

(73) Assignee: THERMO ELECTRON SCIENTIFIC INSTRUMENTS LLC, Madison, WI (US)

( * ) Notice: Subject to any disclaimer, the term of this patent is extended or adjusted under 35 U.S.C. 154(b) by 229 days.

(21) Appl. No.: 18/181,236

(22) Filed: Mar. 9, 2023

(65) Prior Publication Data

US 2024/0210313 A1 Jun. 27, 2024

Related U.S. Application Data

(60) Provisional application No. 63/435,106, filed on Dec. 23, 2022.

(51) Int. Cl.
G01N 21/35 (2014.01)

(52) U.S. Cl.
CPC .................... *G01N 21/35* (2013.01)

(58) Field of Classification Search
None
See application file for complete search history.

(56) References Cited

U.S. PATENT DOCUMENTS

| | | | |
|---|---|---|---|
| 3,958,882 A | 5/1976 | Gast | |
| 6,667,808 B2 * | 12/2003 | Clermont | G01J 3/02 250/339.08 |
| 7,119,904 B2 | 10/2006 | Coffin et al. | |
| 8,094,308 B2 | 1/2012 | Hasegawa | |
| 8,547,555 B1 | 10/2013 | Bradley et al. | |
| 8,975,604 B2 | 3/2015 | Iverson et al. | |

(Continued)

OTHER PUBLICATIONS

Migdall et al., "Filter Transmittance Measurements in the Infrared," J Res Natl Inst Stand Technol, 1993, 98(6): 691-697.

(Continued)

*Primary Examiner* — Marcus H Taningco
(74) *Attorney, Agent, or Firm* — Michael Best & Friedrich LLP

(57) ABSTRACT

An absolute transmission accessory for a spectrometer. One example spectrometer system includes a base plate, a light source configured to transmit light, and an interferometer mounted to the base plate. The interferometer receives the light from the light source and output modulated light. The spectrometer system includes a first optical element configured to receive the modulated light and direct the modulated light, and a second optical element configured to receive the modulated light and focus the modulated light to a sample compartment. The spectrometer system includes a detector compartment including one or more detectors, the detector compartment configured to receive light from the sample compartment. The spectrometer system includes a sample holder coupled to the base plate. The modulated light is directed to the sample holder, and light exiting the sample holder is directed through the sample compartment and to the detector compartment via the second optical element.

20 Claims, 21 Drawing Sheets

(56) References Cited

U.S. PATENT DOCUMENTS

| | | |
|---|---|---|
| 9,121,755 B2 | 9/2015 | Izzia et al. |
| 2001/0035957 A1 | 11/2001 | Clermont et al. |
| 2019/0186991 A1* | 6/2019 | Kovach ................ G01J 3/0202 |

OTHER PUBLICATIONS

Compton et al., "Accurate infrared transmittance measurements on optical filters using an FT-IR spectrometer," Appl Opt, 1990, 29(19): 2908-2912.

European Patent Office. Extended European Search Report for Application No. 23215456.7, dated Apr. 26, 2024 (9 pages).

Fisher, D.S. et al. "Spectrometer design for transmission and reflection measurements of full-scale windows." Window and Dome Technologies and Materials V. vol. 3060. SPIE, 1997 (13 pages).

* cited by examiner

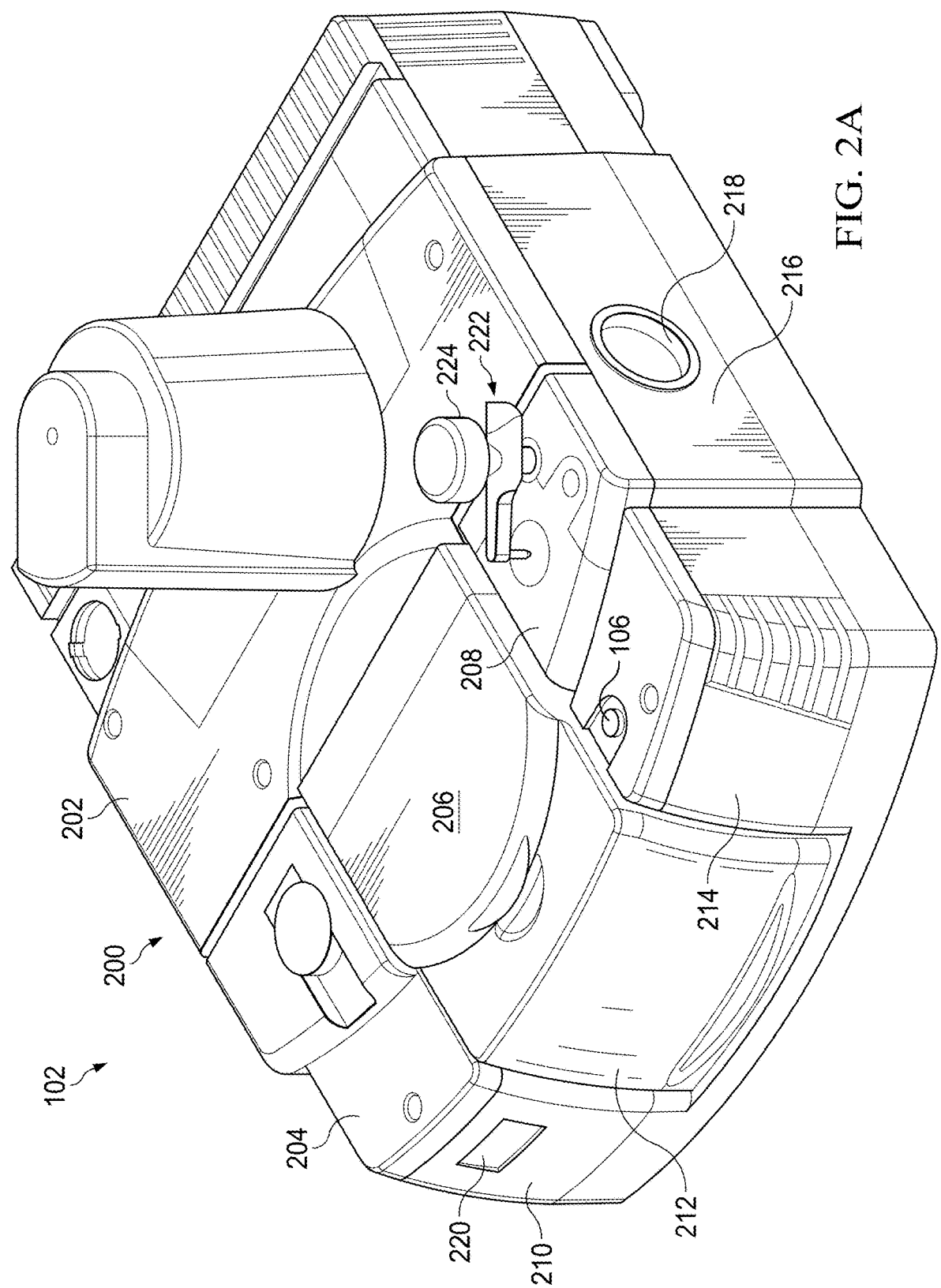

SPECTROMETER WITH ABSOLUTE TRANSMISSION ACCESSORY

RELATED APPLICATIONS

This application claims the benefit of U.S. Provisional Patent Application No. 63/435,106, filed Dec. 23, 2022, the entire content of which is hereby incorporated by reference.

FIELD

Embodiments described herein relate to spectrometers and, more specifically, to spectrometers configured to receive an absolute transmission measurement device.

SUMMARY

Fourier transform infrared (FTIR) spectrometers are utilized to perform accurate and efficient identification of the chemical composition of a sample. Such spectrometers typically incorporate an interferometer such as a Michelson interferometer that has a beamsplitter and a moving mirror. The interferometer modulates the beam from a source to provide an output beam in which the intensity of the radiation at various wavelengths is varied. The light may be in the near ultraviolet (UV), visible (Vis), near-infrared (NIR), mid-infrared (MIR), and/or far-infrared (FIR) wavelength ranges, and thus, is not limited to the infrared spectral region. The output beam is focused and passed through or reflected from a sample, after which the beam is collected and focused onto a detector. The detector provides a time varying output signal that contains information concerning the wavelengths of absorbance or reflectance of the sample. For example, the intensity of the output light at the one or more wavelengths is compared to the intensity of the input light at the one or more wavelengths to determine characteristics of the sample, such as the absorbance, the transmittance, the fluorescence, the reflectance, etc. Fourier analysis is performed on the output signal data to yield the measured characteristics that provide information about the identity of the components within the sample, their relative concentrations, and possibly other features of the sample.

Conventional FTIR spectrometers include a sample chamber in which a sample is held in a position to be exposed to the light from the interferometer. The sample may take various physical states, i.e., a liquid, a solid, or a gas, and solid samples may have various physical characteristics. For example, a solid material to be analyzed may be in the form of a block or sheet of material (e.g., polymer plastics), in the form of powders or granulates, or in specific formed shapes (e.g., pharmaceutical tablets, pills and capsules).

Optical properties in applied optical device development include the reflectivity and transmissivity of light. The transmission value is the absolute transmission (AT), meaning the light as measured without referral to a reference material. Accurate AT measurements require collimated light that may be different than light used for other measurements, such as attenuated total reflectance (ATR) measurements. Traditional spectrometers require the removal or addition of optical elements to achieve collimated light required for AT measurements. For example, in a traditional spectrometer, one or more optical elements, such as, for example, one or more mirrors, may need to be removed and replaced from the primary spectrometer optics to direct appropriate light to a sample for AT measurements. Such a modification makes the spectrometer dedicated to AT measurements, and, thus, renders the spectrometer, in its current form, unusable for other types of measurements. Furthermore, each time a modification is needed to allow the spectrometer to take a particular measurement, the modification risks damage to the spectrometer or components or accessories thereof or improper installation, which risks inaccurate or inefficient measurements.

Embodiments described herein provide for AT measurements without the need for modification to existing spectrometer optics, which provides efficient and accurate access to AT measurements. For example, an AT device is provided to enable insertion of a sample, aperture, and screen (e.g., in a single assembly), without altering any additional components of or associated use of the spectrometer. The AT device may be inserted at a location within the spectrometer that positions the AT device to receive collimated light generated by existing components of the spectrometer. The aperture and screen are provided to direct an incoming light beam to the sample and downstream optical components. For example, the aperture, the screen, or the combination thereof may assist in removing back reflections that may cause an offset in recorded values. The AT device, the spectrometer, or both may include an on-board detector for detecting insertion of a sample and, optionally, a type of the sample holder, which information may be transmitted to one or more other components of the spectrometer, an interfaced computing device, or a combination thereof (e.g., a detector, an electronic processor) to configure the spectrometer, the interfaced computing, or a combination thereof to perform an AT measurement.

In an illustrative embodiment, a spectrometer system for analyzing a sample is provided. The spectrometer system includes, but is not limited to, a base plate, a light source configured to transmit light, and an interferometer mounted to the base plate. The interferometer is configured to receive the light from the light source and output modulated light. The spectrometer system includes a first optical element. The first optical element is configured to receive the modulated light and direct the modulated light towards a second optical element. The second optical element focuses the modulated light to a sample compartment. The spectrometer system also includes a detector compartment including one or more detectors. The detector compartment is configured to receive the modulated light from the sample compartment. The spectrometer system includes a sample holder configured to hold a sample for an AT measurement. The sample holder is coupled (e.g., removably) to the base plate. Given its position on the base plate, modulated light from the first optical element is directed to the sample holder, and light exiting the sample holder is directed through the sample compartment and to the detector compartment via the second optical element.

In another illustrative embodiment, a method for operating a spectrometer system is provided. The method includes, but is not limited to, transmitting light via a light source, receiving, with an interferometer, the light from the light source, and outputting, with the interferometer, a modulated light. The method includes receiving, with a first optical element, the modulated light, and, in a first mode of operation of the spectrometer system, directing, with the first optical element, the modulated light through a sample holder holding a sample and to a second optical element. The method includes, while in the first mode of operation of the spectrometer system, receiving, with the second optical element, the modulated light, focusing, with the second optical element, the modulated light to a sample compartment, and receiving, with a detector compartment including one or more detectors, light from the sample compartment.

Other aspects will become apparent by consideration of the detailed description and accompanying drawings.

BRIEF DESCRIPTION OF THE DRAWINGS

Illustrative embodiments of the invention will hereafter be described with reference to the accompanying drawings, wherein like numerals denote like elements.

FIG. 2A depicts a perspective view of a spectrometer in accordance with an illustrative embodiment.

DETAILED DESCRIPTION

Figure 1:
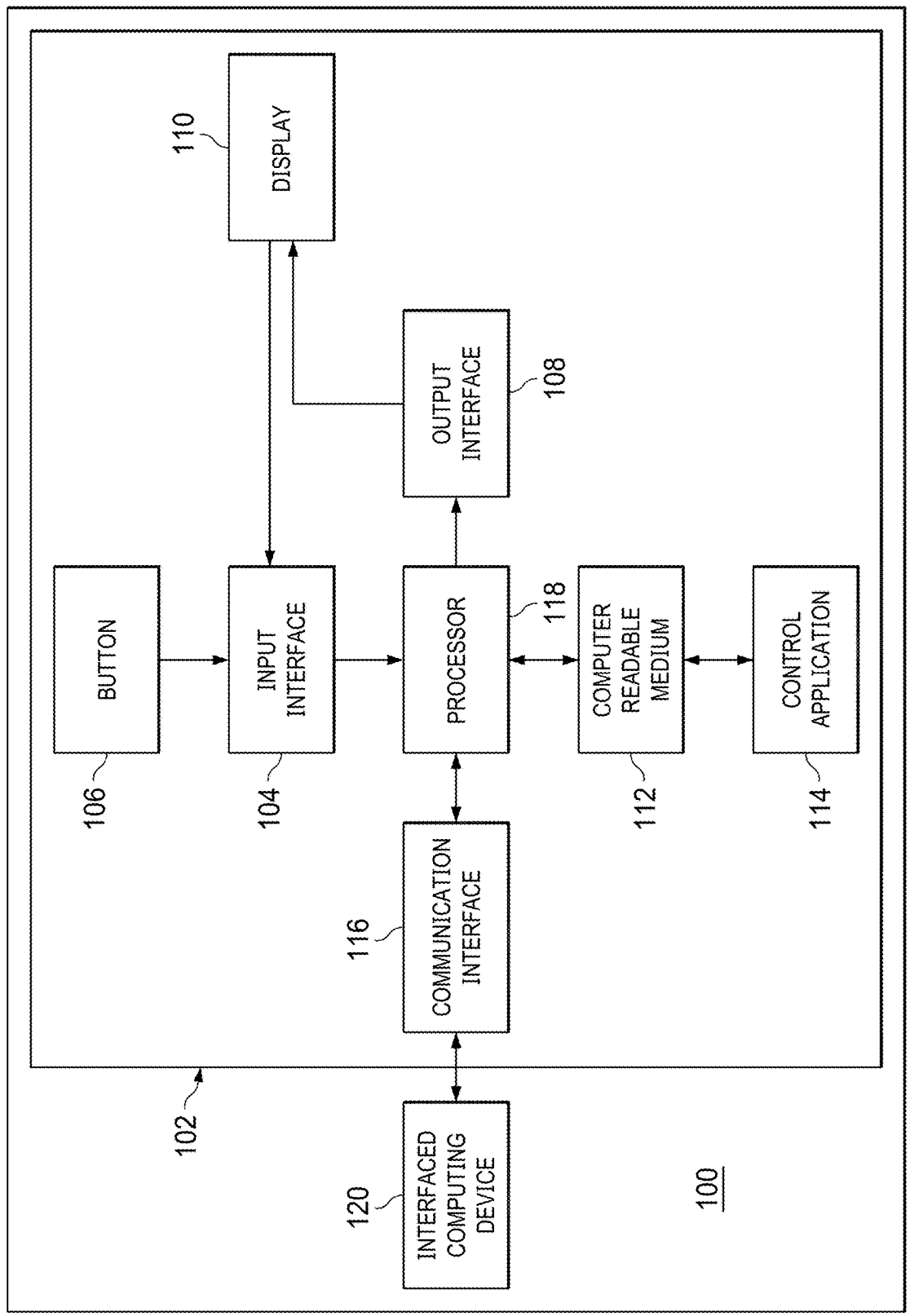
FIG. 1 depicts a block diagram of a spectroscopy system in accordance with an illustrative embodiment.

Before any embodiments are explained in detail, it is to be understood that the embodiments described herein are provided as examples and the details of construction and the arrangement of the components described herein or illustrated in the accompanying drawings should not be considered limiting. Also, it is to be understood that the phraseology and terminology used herein is for the purpose of description and should not be regarded as limited. The use of "including," "comprising" or "having" and variations thereof herein is meant to encompass the items listed thereafter and equivalents thereof as well as additional items. The terms "mounted," "connected" and "coupled" are used broadly and encompass both direct and indirect mounting, connecting, and coupling. Further, "connected" and "coupled" are not restricted to physical or mechanical connections or couplings, and may include electrical connections or couplings, whether direct or indirect. Also, electronic communications and data exchanges may be performed using any known means including direct connections, wireless connections, and the like.

It should be noted that a plurality of hardware and software-based devices, as well as a plurality of different structural components may be utilized to implement the embodiments described herein or portions thereof. In addition, it should be understood that embodiments described herein may include hardware, software, and electronic components or modules that, for purposes of discussion, may be illustrated and described as if the majority of the components were implemented solely in hardware. However, one of ordinary skill in the art, and based on a reading of this detailed description, would recognize that, in at least one embodiment, the electronic based aspects described herein may be implemented in software (stored on non-transitory computer-readable medium) executable by one or more processors. As such, it should be noted that a plurality of hardware and software-based devices, as well as a plurality of different structural components may be used to implement the embodiments described herein. For example, "controller" described in the specification may include one or more processors, one or more memory modules including non-transitory computer-readable medium, one or more input/output interfaces, and various connections (for example, a system bus) connecting the components.

As understood by a person of skill in the art, Fourier transform infrared (FTIR) spectroscopy is a measurement technique where, instead of recording the amount of energy absorbed in each individual spectral range, the energy across the entire spectra is collected by a single detector. The light source emits broadband infrared energy that is directed into an interferometer, such as a Michelson interferometer, which splits the light. The light that comes out of the interferometer is directed into a sample compartment of a sample analysis device. The light interacts with the sample and is either transmitted through or reflected off of the surface of the sample depending on the type of analysis performed by the sample analysis device. After exiting the sample compartment, the light reaches a detector and is measured to produce a sample analysis signal. Using the Fourier transform, the sample analysis signal is transformed from the frequency domain to the time domain to obtain spectral information about the sample. Typically, a FTIR spectrometer includes a laser for internal calibration of the interferometer.

A FTIR spectrometer may include an ATR for performing the total reflectance measurements. A FTIR spectrometer with a built-in ATR is disclosed in U.S. Pat. No. 8,547,555B1, by Bradley et al., which is incorporated herein by reference for all purposes. As described herein, a spectrometer, such as a FTIR spectrometer, may include an AT device for performing the absolute transmission measurement of a sample held by the AT device. The AT device is removably mounted to the spectrometer. The AT device may be mounted to the spectrometer in a position for receiving the collimated beam (such as light 548) generated from the interferometer. In other words, the collimated beam output by the interferometer irradiates the sample in the AT device for AT measurement. When the ATR device is removed from the spectrometer, the collimated beam may be focused and directed to the accessory compartment for analyzing a sample in the accessory compartment. In one example, the ATR may be removably mounted to the spectrometer, and the AT device may be mounted to the spectrometer after removing the ATR. In another example, the AT device may be mounted to the spectrometer without removing the ATR device. In either situation, AT measurements can be performed with minimal adjustment to other optical components in the spectrometer.

With reference to FIG. 1, a block diagram of a spectrometry system 100 is shown in accordance with an illustrative embodiment. In the illustrative embodiment, spectrometry system 100 may include a spectrometer 102 and an interfaced computing device 120 to which spectrometer 102 may be connected. Spectrometer 102 need not connect to interfaced computing device 120. If connected, spectrometer 102 and interfaced computing device 120 may be connected directly or through a network. The network may be any type of wired and/or wireless public or private network including a cellular network, a local area network, a wide area network such as the Internet, etc. Spectrometer 102 may send and receive information to/from interfaced computing device 120. For example, spectrometer 102 may send results obtained for a sample for storage on interfaced computing device 120. As another example, spectrometer 102 may receive software updates from interfaced computing device 120 and/or receive commands from interfaced computing device 120. The commands may control operation of one or more components of spectrometer 102. Interfaced computing device 120 may include a computing device of any form factor such as a personal digital assistant, a desktop computer, a laptop computer, an integrated messaging device, a cellular telephone, a smart phone, a pager, etc. without limitation.

Spectrometer 102 may include an input interface 104, a button 106, an output interface 108, a display 110, a computer-readable medium 112, a control application 114, a communication interface 116, and a processor 118 (e.g., an electronic processor). Different and additional components may be incorporated into spectrometer 102. Input interface 104 provides an interface for receiving information from the user for entry into spectrometer 102 as known to those skilled in the art. Input interface 104 may use various input technologies including, but not limited to, a keyboard, a pen and touch screen, a mouse, a track ball, a touch screen, a keypad, one or more buttons including button 106, etc. to allow the user to enter information into spectrometer 102 or to make selections presented in a user interface displayed on display 110. Spectrometer 102 may have one or more input interfaces that use the same or a different input interface technology.

Output interface 108 provides an interface for outputting information for review by a user of spectrometer 102. For example, output interface 108 may include an interface to display 110, a speaker, a printer, etc. Display 110 may be a thin film transistor display, a light emitting diode display, a liquid crystal display, or any of a variety of different displays known to those skilled in the art. Spectrometer 102 may have one or more output interfaces that use the same or a different interface technology. The same interface may support both input interface 104 and output interface 108. For example, a touch screen both allows user input and presents output to the user. Display 110, the speaker, and/or the printer further may be accessible to spectrometer 102 through communication interface 116.

Computer-readable medium 112 is an electronic holding place or storage for information so that the information can be accessed by processor 118 as known to those skilled in the art. Computer-readable medium 112 can include, but is not limited to, any type of random access memory (RAM), any type of read only memory (ROM), any type of flash memory, etc. such as magnetic storage devices (e.g., hard disk, floppy disk, magnetic strips, or the like), optical disks (e.g., CD, DVD, or the like), smart cards, flash memory devices, etc. Spectrometer 102 may have one or more computer-readable media that use the same or a different memory media technology. Spectrometer 102 also may have one or more drives that support the loading of a memory media such as a CD or DVD.

Communication interface 116 provides an interface for receiving and transmitting data between devices using various protocols, transmission technologies, and media as known to those skilled in the art. Communication interface 116 may support communication using various transmission media that may be wired or wireless. Spectrometer 102 may have one or more communication interfaces that use the same or a different communication interface technology. Data and messages may be transferred between spectrometer 102 and interfaced computing device 124 using communication interface 116.

Processor 118 executes instructions as known to those skilled in the art. The instructions may be carried out by a special purpose computer, logic circuits, or hardware circuits. Thus, processor 118 may be implemented in hardware, firmware, or any combination of these methods and/or in combination with software. The term "execution" is the process of running an application or the carrying out of the operation called for by an instruction. The instructions may be written using one or more programming language, scripting language, assembly language, etc. Processor 118 executes an instruction, meaning that it performs/controls the operations called for by that instruction. Processor 118 operably couples with output interface 108, with input interface 104, with computer-readable medium 112, and with communication interface 116 to receive, to send, and to process information. Processor 118 may retrieve a set of instructions from a permanent memory device and copy the instructions in an executable form to a temporary memory device that is generally some form of RAM. Spectrometer 102 may include a plurality of processors that use the same or a different processing technology.

Control application 114 performs operations associated with controlling, maintaining, updating, etc. the operation of spectrometer 102. Some or all of the operations described herein may be controlled by instructions embodied in control application 114. The operations may be implemented using hardware, firmware, software, or any combination of these methods. With reference to the example embodiment of FIG. 1, control application 114 is implemented in software (comprised of computer-readable and/or computer-executable instructions) stored in computer-readable medium 112 and accessible by processor 118 for execution of the instructions that embody the operations of control application 114. Control application 114 may be written using one or more programming languages, assembly languages, scripting languages, etc.

With reference to FIG. 2A, a perspective view of spectrometer 102 with a mounted ATR is shown in accordance with an illustrative embodiment. The components of spectrometer 102 are mounted within or to a housing 200 and may be arranged in a variety of manners. As used in this disclosure, the term "mount" includes join, unite, connect, associate, insert, hang, hold, affix, attach, fasten, bind, paste, secure, bolt, screw, rivet, solder, weld, glue, form over, layer, and other like terms. The phrases "mounted on" and "mounted to" include any interior or exterior portion of the element referenced. As used herein, the mounting may be a direct mounting between the referenced components or an indirect mounting through intermediate components between the referenced components.

Housing 200 may include a plurality of walls that surround one or more of the components of spectrometer 102. For example, housing 200 may include a top bench compartment wall 202, a top detector wall 204, a top accessory compartment wall 206, a top ATR compartment wall 208, a front detector wall 210, a front accessory compartment wall 212, a front ATR compartment wall 214, a left side wall 400 (shown with reference to FIG. 4), a right side wall 216, a base plate 500 (shown with reference to FIGS. 5A-5B), and a back wall 502 (shown with reference to FIGS. 5A-5B). In an illustrative embodiment, electrical connectors that may embody an interface for input interface 104, output interface 108, and communication interface 116 are mounted in back wall 502. In the illustrative embodiment, button 106 is mounted on top ATR compartment wall 208 and triggers the operation of spectrometer 102 either on or off. Thus, measurements may be initiated by selecting button 106 that triggers initiation of a measurement sequence by one or more components of spectrometer 102 under control of control application 114.

In the illustrative embodiment, a bench compartment is housed generally between top bench compartment wall 202, base plate 500, left sidewall 400, right sidewall 216, and back wall 502. In the illustrative embodiment, a detector compartment is housed generally between top detector wall 204, base plate 500, left side wall 400, the bench compartment, an accessory compartment 300 (shown with reference to FIG. 3), and front detector wall 210. In the illustrative embodiment, accessory compartment 300 (also referred to herein as the sample compartment) is housed generally between top accessory compartment wall 206, floor plate 302 (shown with reference to FIG. 3), the bench compartment, the detector compartment, an ATR compartment, and front accessory compartment wall 212. In the illustrative embodiment, the ATR compartment is housed generally between top ATR compartment wall 208, base plate 500, the bench compartment, accessory compartment 300, front ATR compartment wall 214, and right side wall 216. Other compartment arrangements are possible. In the illustrative embodiment, right side wall 216 includes a first light port 218, front detector wall 210 includes a detector output port 220, and an ATR arm 222 is mounted to top ATR compartment wall 208 for rotational movement of ATR arm 222 toward and away from top ATR compartment wall 208. ATR arm 222 may include an ATR knob 224.

Figure 2B:
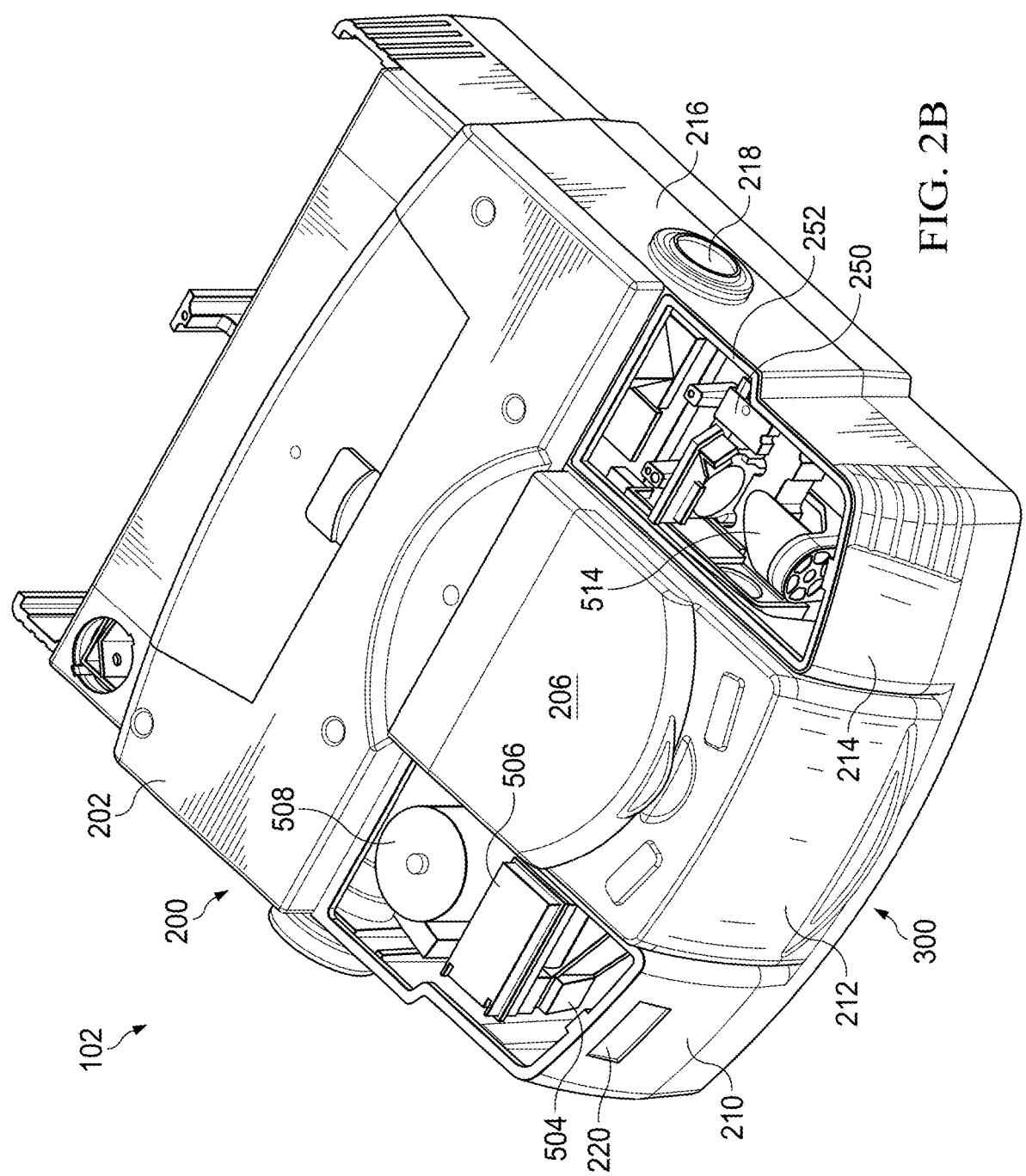
FIG. 2B depicts a perspective view of a spectrometer in accordance with another illustrative embodiment.

FIG. 2B illustrates a perspective view of spectrometer 102 is shown in accordance with another illustrative embodiment. In the embodiment of FIG. 2B, instead of the ATR, an AT device is mounted to the spectrometer. Comparing to FIG. 2A, in FIG. 2B, the top detector wall 204 and the top ATR compartment wall 208 are removed. An AT device 250 is provided within the housing 200 and housed generally adjacent to the right side wall 216 and front ATR compartment wall 214. In some embodiments, as illustrated in FIG. 2A, the AT device 250 replaces the ATR arm 222 and related optical components (e.g., ATR 512 shown with reference to FIG. 5A). An optical element 514 is situated optically downstream from the AT device 250. Removal of the top detector wall 204 exposes a first detector 504, a second detector 506, and a third detector 508 (shown with reference to FIGS. 5A-5B). The optical element 514 steers light received from the AT device 250 through an accessory compartment 300 (shown with reference to FIG. 3) and to the first detector 504, the second detector 506, and the third detector 508.

In some instances, the AT device 250 is a removable accessory such that a user may insert either the AT device 250 or the ATR 512 interchangeably. In other embodiments, the base plate 500 is configured to receive only either the AT device 250 or the ATR 512. The top ATR compartment wall 208 may be a removable cover allowing access to the AT device 250. In some instances, the top ATR compartment wall 208 includes a gasket 252 to seal the top ATR compartment wall 208 to the housing 200. Sample holders held by the AT device 250 may be replaced, as described below with respect to FIGS. 13-16. When the AT device 250 is installed, the spectrometer 102 may operate in a first operating mode (described with respect to FIG. 19). When the ATR 512 is installed, the spectrometer 102 may operate in a second operating mode (described with respect to FIG. 19).

Figure 3:
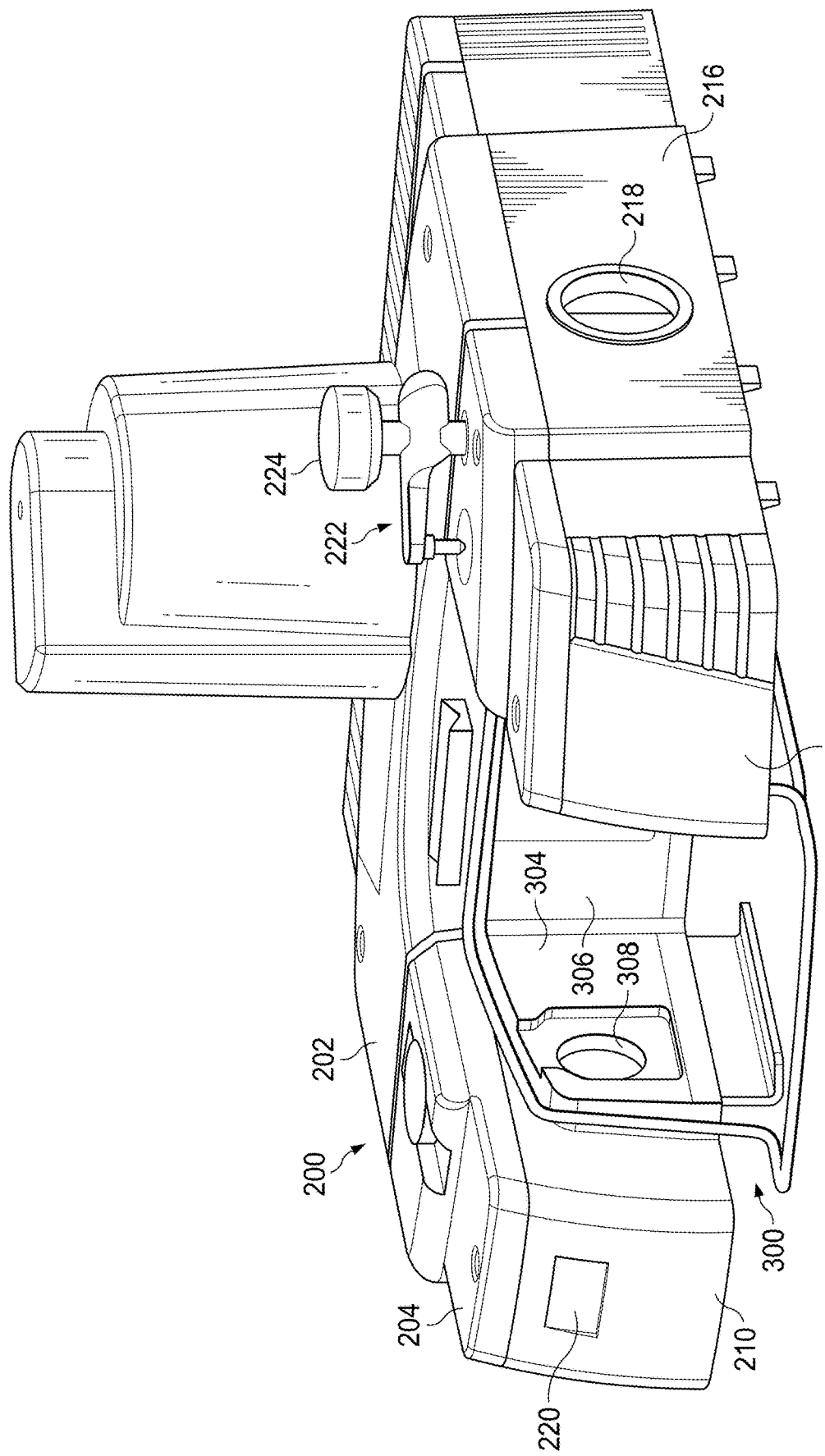
FIG. 3 depicts a right side perspective view of the spectrometer of FIG. 2 without cover plates over an accessory compartment.
Figure 4:
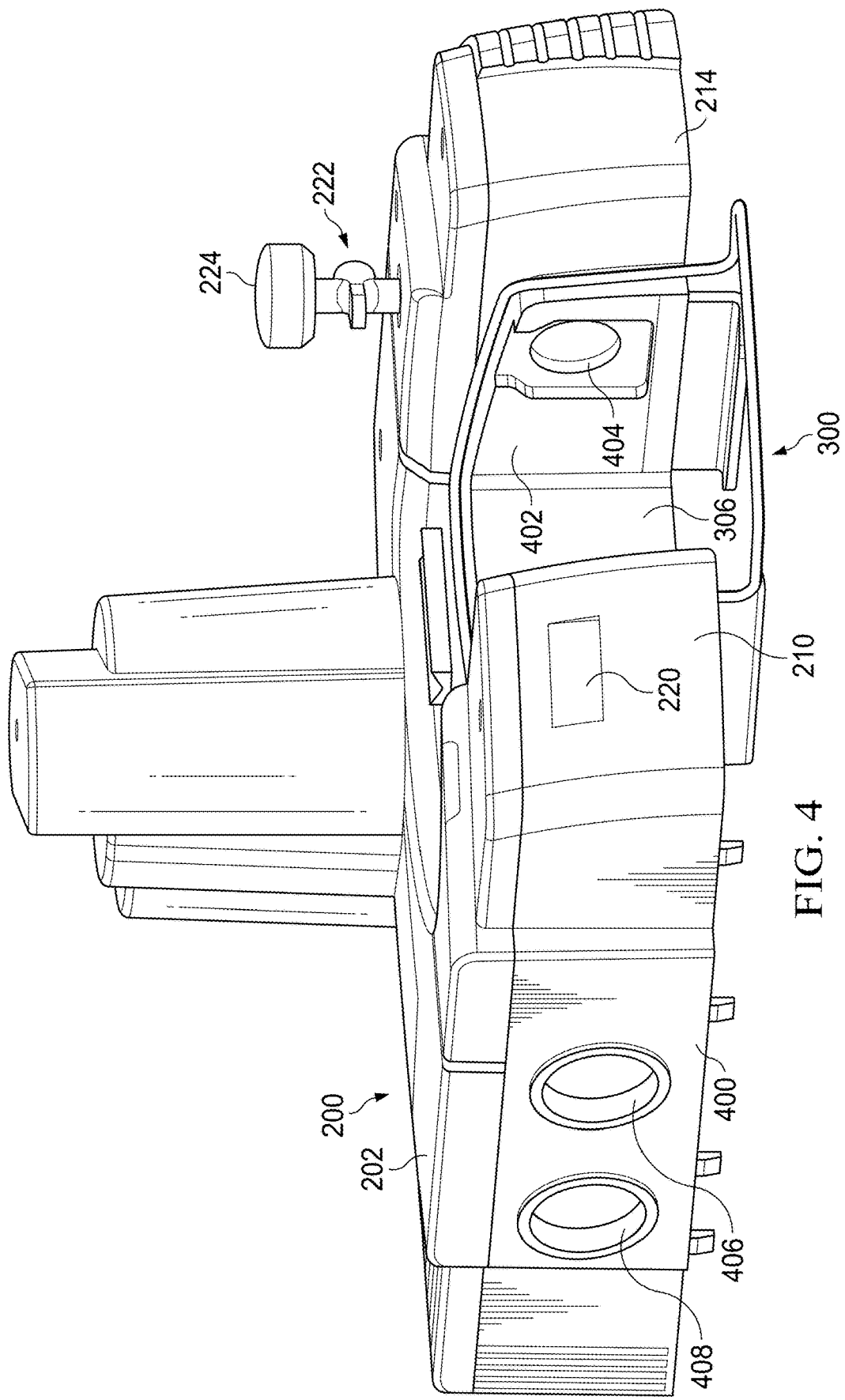
FIG. 4 depicts a left side perspective view of the spectrometer of FIG. 2 without cover plates over an accessory compartment.

With reference to FIG. 3, a right side perspective view of spectrometer 102 is shown in accordance with an illustrative embodiment with top accessory compartment wall 206 and front accessory compartment wall 212 removed to show accessory compartment 300. With reference to FIG. 4, a left side perspective view of spectrometer 102 is shown in accordance with an illustrative embodiment with top accessory compartment wall 206 and front accessory compartment wall 212 removed to show accessory compartment 300. Accessory compartment 300 may be defined by top accessory compartment wall 206, front accessory compartment wall 212, floor plate 302, a left accessory compartment wall 304, a back accessory compartment wall 306, and a right accessory compartment wall 402 (shown with reference to FIG. 4). In the illustrative embodiment, left accessory compartment wall 304 includes a second light port 308 through which light can be provided from accessory compartment 300 to the detector compartment depending on a type of sample analysis accessory device mounted within accessory compartment 300. Though not shown, accessory compartment 300 includes one or more electrical connectors that may provide power to the sample analysis accessory device mounted within accessory compartment 300, may receive signals from the sample analysis accessory device mounted within accessory compartment 300, and/or may send signals to the sample analysis accessory device mounted within accessory compartment 300. The signals may be sent/received by spectrometer 102 and/or by interfaced computing device 124. Illustrative sample analysis accessory devices include a gas chromatography (GC) IR (GC-IR) device, a near IR (NIR) integrating sphere device, a NIR or mid-IR (MIR) fiber optic probe, a thermogravimetric analysis (TGA) device, an IR microscope, an FT-Raman device, a diffuse reflectance device, a single-bounce or multiple-bounce ATR device, a single-bounce or multiple-bounce horizontal ATR (HATR) device, a specular reflectance device, a grazing incidence angle reflectance device, a photoacoustic device, a liquid chromatography device, a photo elastic modulation (PEM) device, etc.

In the illustrative embodiment, right accessory compartment wall 402 includes a third light port 404 through which light can be provided from/to the ATR compartment to/from accessory compartment 300 depending on the type of sample analysis accessory device mounted within accessory compartment 300. In the illustrative embodiment, left side wall 400 includes a fourth light port 406 and a fifth light port 408. A fewer or a greater number of input and output ports may be included in the walls of spectrometer 102. First light port 218, fourth light port 406, and fifth light port 408 receive or transmit light exterior of spectrometer 102 as defined by base plate 500.

Figure 5A:
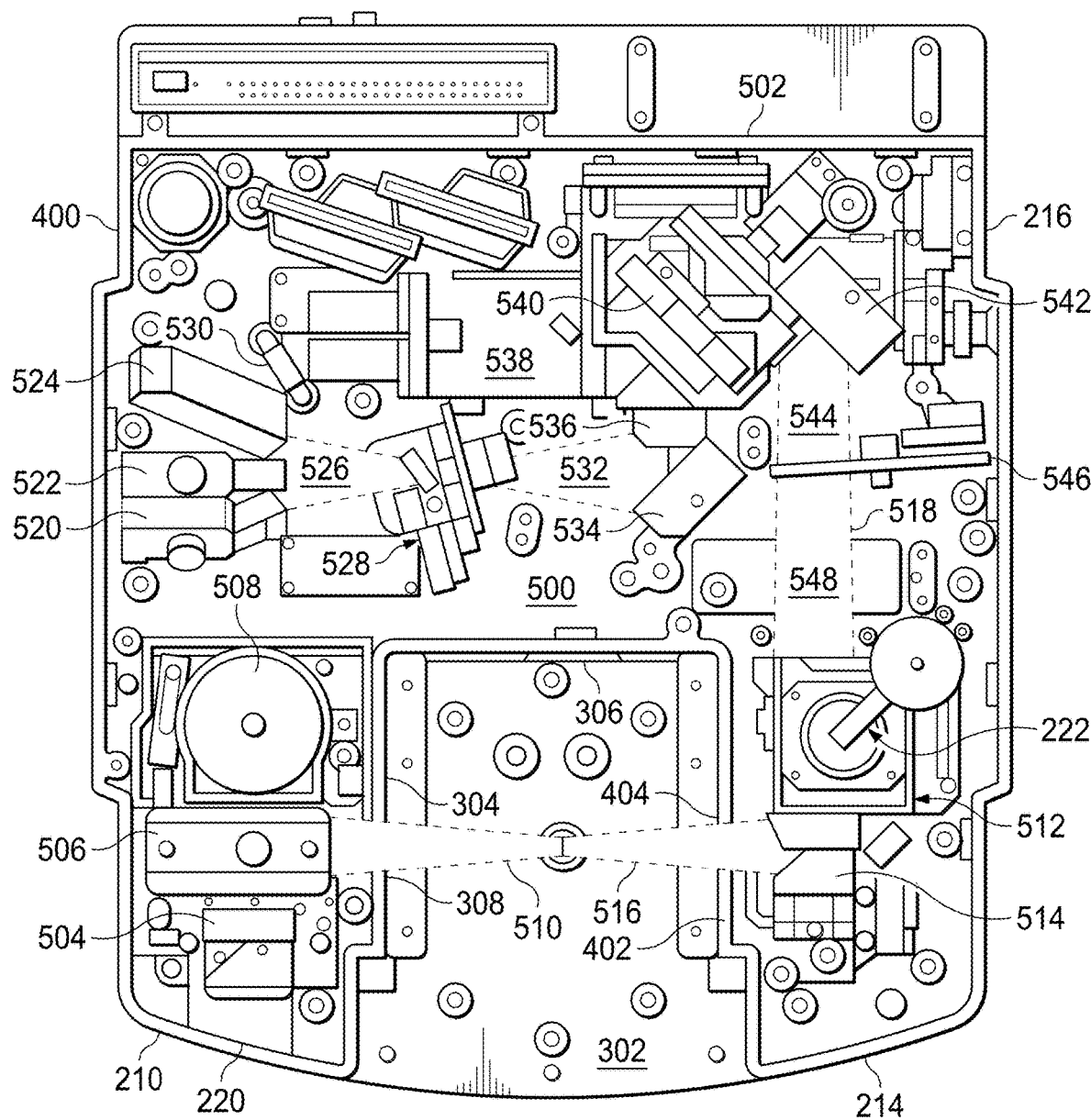
FIG. 5A depicts a top view of the spectrometer of FIG. 2A without any cover plates.
Figure 5B:
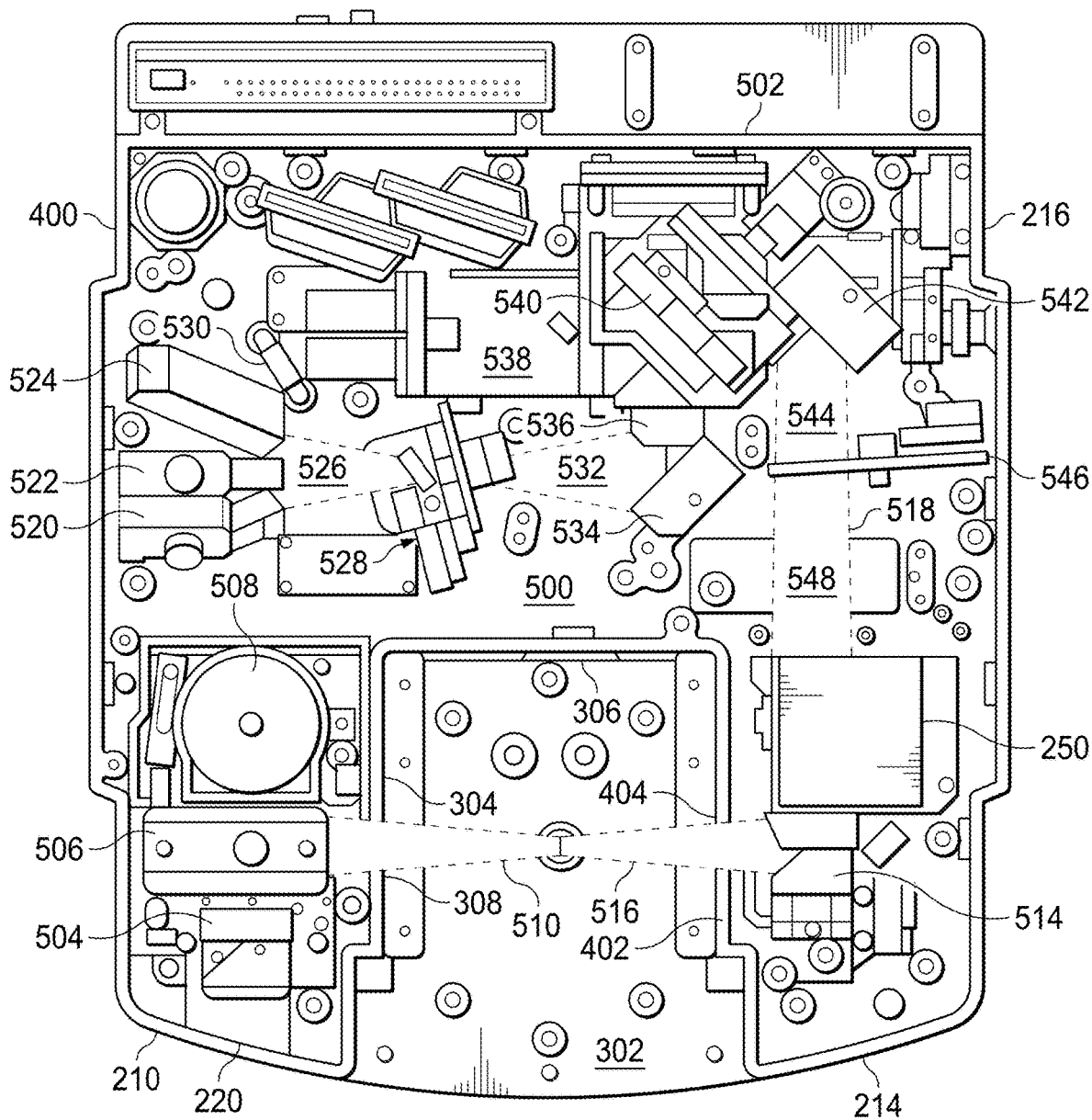
FIG. 5B depicts a top view of the spectrometer of FIG. 2B without any cover plates.

With reference to FIGS. 5A-5B, a top view of spectrometer 102 is shown in accordance with an illustrative embodiment with front accessory compartment wall 212, top bench compartment wall 202, top detector wall 204, top accessory compartment wall 206, and top ATR compartment wall 208 removed to show an interior of spectrometer 102. In an illustrative embodiment, the detector compartment includes a plurality of detectors and an optical element (not shown) positioned to receive a light beam 510 from accessory compartment 300. For example, in the illustrative embodiment, the detector compartment includes a first detector 504, a second detector 506, and a third detector 508. For illustration, first detector 504 may be a deuterated triglycine sulfate (DTGS) detector, second detector 506 may be a deuterated, L-alanine doped triglycine sulfate (DLaTGS) detector, and third detector 508 may be a nitrogen-cooled mercury-cadmium-telluride (MCT) detector though of course other types of detectors and arrangements of detectors may be used. The optical element may be mounted to an actuator, which moves the optical element to reflect the received light beam 510 to the selected detector. The actuator may be used to control translational and/or rotational movement of the optical element. Illustrative actuators, as used herein, include an electric motor, a servo, stepper, or piezo motor, a pneumatic actuator, a gas motor, etc. The actuator further may move the optical element to reflect the received light beam 510 through detector output port 220 and to an externally mounted detector. In an illustrative embodiment, the optical element is an elliptical mirror.

In an illustrative embodiment of FIG. 5A, the ATR compartment includes an ATR 512, which includes ATR arm 222 and the optical element 514 positioned to reflect/receive a light beam 516 to/from accessory compartment 300 through third light port 404. Optical element 514 further may be positioned to reflect/receive a light beam 548 to/from the bench compartment. The light beam 548 may be a collimated light beam. The optical element 514 focuses the light beam 548 to a focused light beam 516 provided to the accessory compartment 300.

In an illustrative embodiment, the bench compartment includes a light source that may include a plurality of light sources that emit light at one or more wavelengths selected for analysis of a sample. The light source may emit in the ultraviolet (UV), visible, IR, NIR, FIR, near-UV, etc. Thus, light emitted from the light source may not be visible. In the illustrative embodiment of FIGS. 5A-5B, the light source includes a first light source 520 and a second light source 522. For illustration, first light source 520 may be an IR source and second light source 522 may be a white light source. In an illustrative embodiment, the bench compartment further includes a Raman detector 524.

An optical element 600 (shown with reference to FIG. 6) may be mounted to an actuator (not shown), which moves optical element 600 to reflect light 526 received from first light source 520 or second light source 522 toward an aperture device 528. The actuator may be used to control translational and/or rotational movement of optical element 600. The actuator further may move optical element 600 to reflect light received from aperture device 528 toward Raman detector 524. In an illustrative embodiment, optical element 600 is an elliptical mirror.

The actuator still further may move optical element 600 to reflect light received from aperture device 528 toward an optical element 530 or to receive light reflected from optical element 530 through fifth light port 408. In an illustrative embodiment, optical element 530 is a parabolic mirror. In an illustrative embodiment, the aperture device 528 automatically sets the correct aperture size depending upon the resolution and spectral range selected for spectrometer 102. Aperture device 528 may include an iris aperture and an iris filter wheel.

Figure 6:
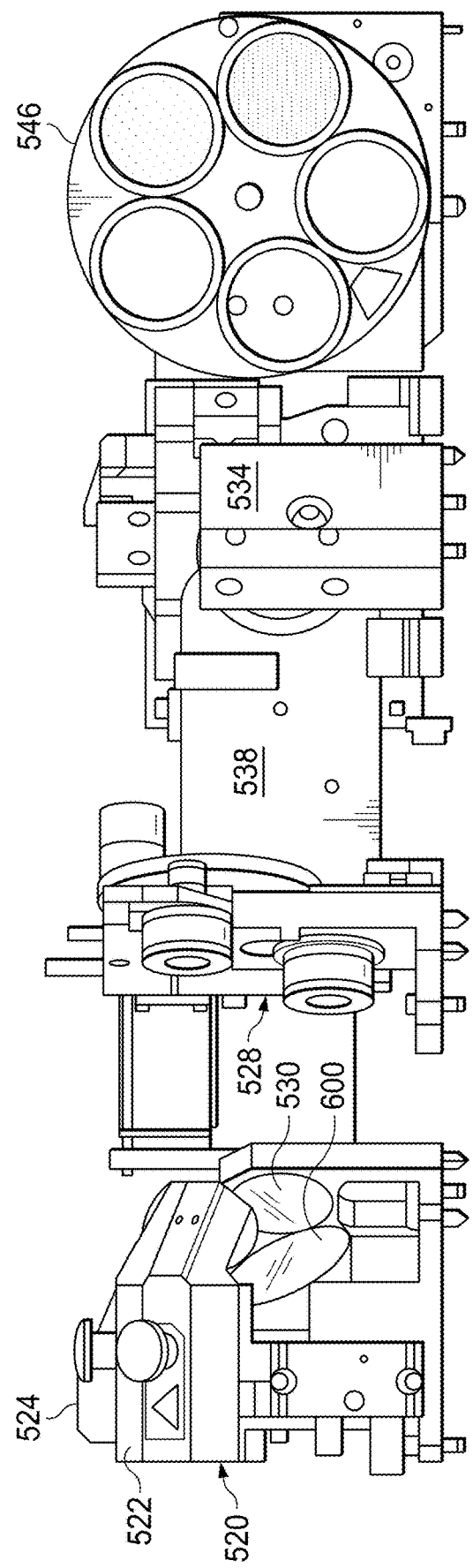
FIG. 6 depicts a side view of a portion of the bench compartment of the spectrometer of FIG. 2 in accordance with an illustrative embodiment.

Aperture device 528 receives/transmits light 532 from/to an optical element 534. In an illustrative embodiment, optical element 534 is a parabolic mirror that reflects light 536 to/from an interferometer 538. In some implementations, the optical element 534 receives the light 532 and generates a collimated light received by the interferometer 538. Interferometer 538 includes a beamsplitter 540 selected based on the type of sample analysis accessory device selected for operation. Spectrometer 102 further may include an automatic beamsplitter exchanger that automatically changes the beamsplitter inserted in interferometer 538. The beamsplitter 540 (and, therefore, the interferometer 538) outputs a modulated light. In some implementations, the interferometer 538 outputs a collimated light. An optical element 542 receives light from beamsplitter 540 and reflects light 544 toward optical element 514 mounted within the ATR compartment. In an illustrative embodiment, optical element 542 is a flat mirror. In some instances, the optical element 542 turns the light 544 approximately 90° towards the optical element 514. Light 544 may pass through a validation wheel 546 to form filtered light 548 before reaching optical element 514. In some embodiments, the filtered light 548 is a collimated light that passes through the AT device 250, when the AT device 250 is installed in the spectrometer 102. The filtered light 548 passes through the AT device 250 to the optical element 514. Validation wheel 546 may be configured to test spectrometer 102 using Schott NG-11 and NIST traceable standards as understood by a person of skill in the art. With reference to FIG. 6, a side view of components of the bench compartment of spectrometer 102 is shown in accordance with an illustrative embodiment.

Figure 7:
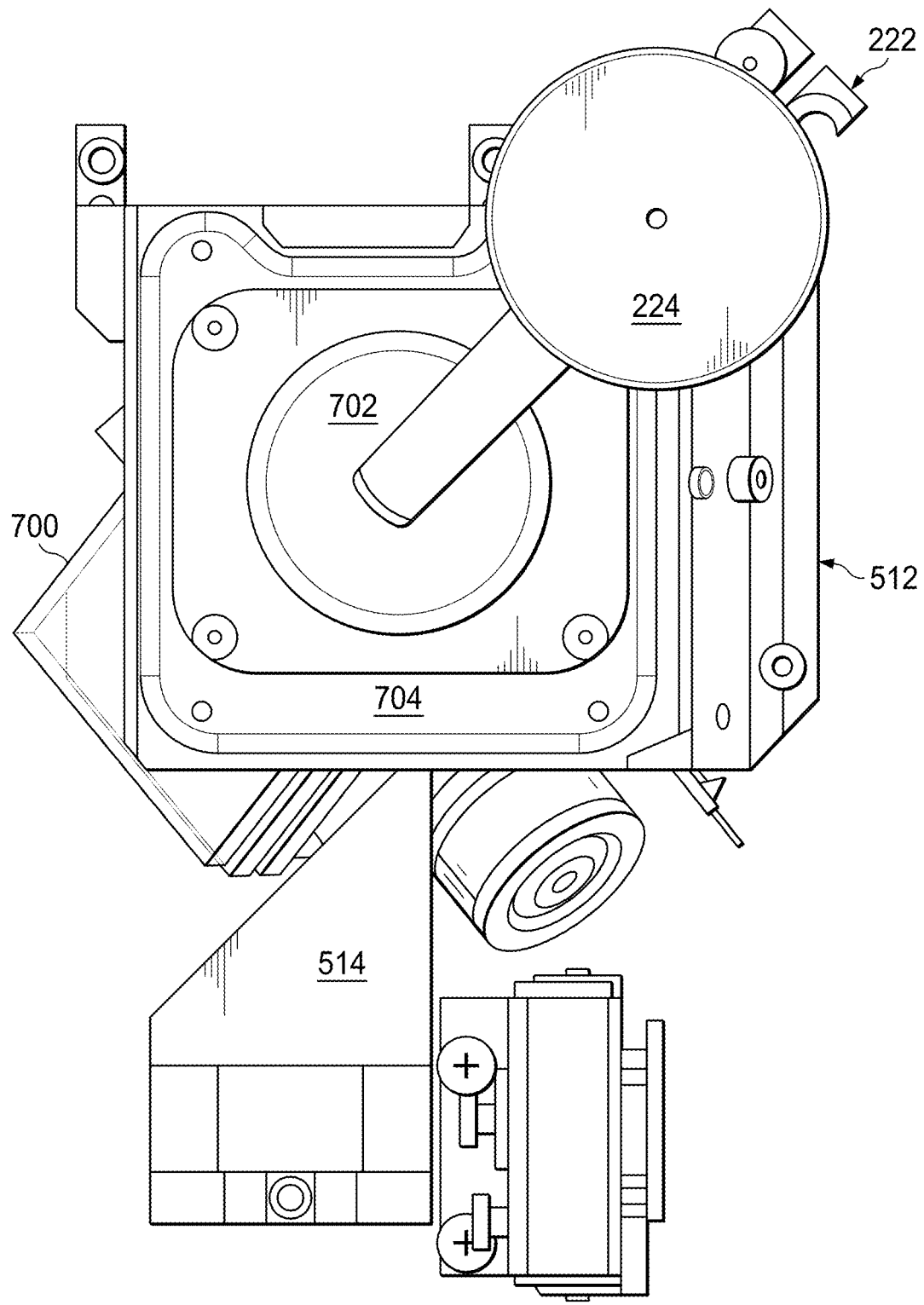
FIG. 7 depicts a top view of an ATR compartment of the spectrometer of FIG. 2 in accordance with an illustrative embodiment.

With reference to FIG. 7, a top view of ATR 512 is shown in accordance with an illustrative embodiment. ATR 512 includes a flipper mirror 700, ATR arm 222, an ATR puck 702, and a platform 704. ATR arm 222 is mounted to base plate 500. ATR puck 702 includes a crystal. For example, in an illustrative embodiment, the crystal is a diamond and ATR puck 702 is a parallel-sided plate. As a result, in the illustrative embodiment, ATR 512 is configured to perform HAIR analysis of a sample. In other embodiments, the crystal may be formed of zinc selenide, germanium, KRS-5, etc. Platform 704 is mounted to ATR arm 222 and positioned generally flush with top ATR compartment wall 208.

Figure 8:
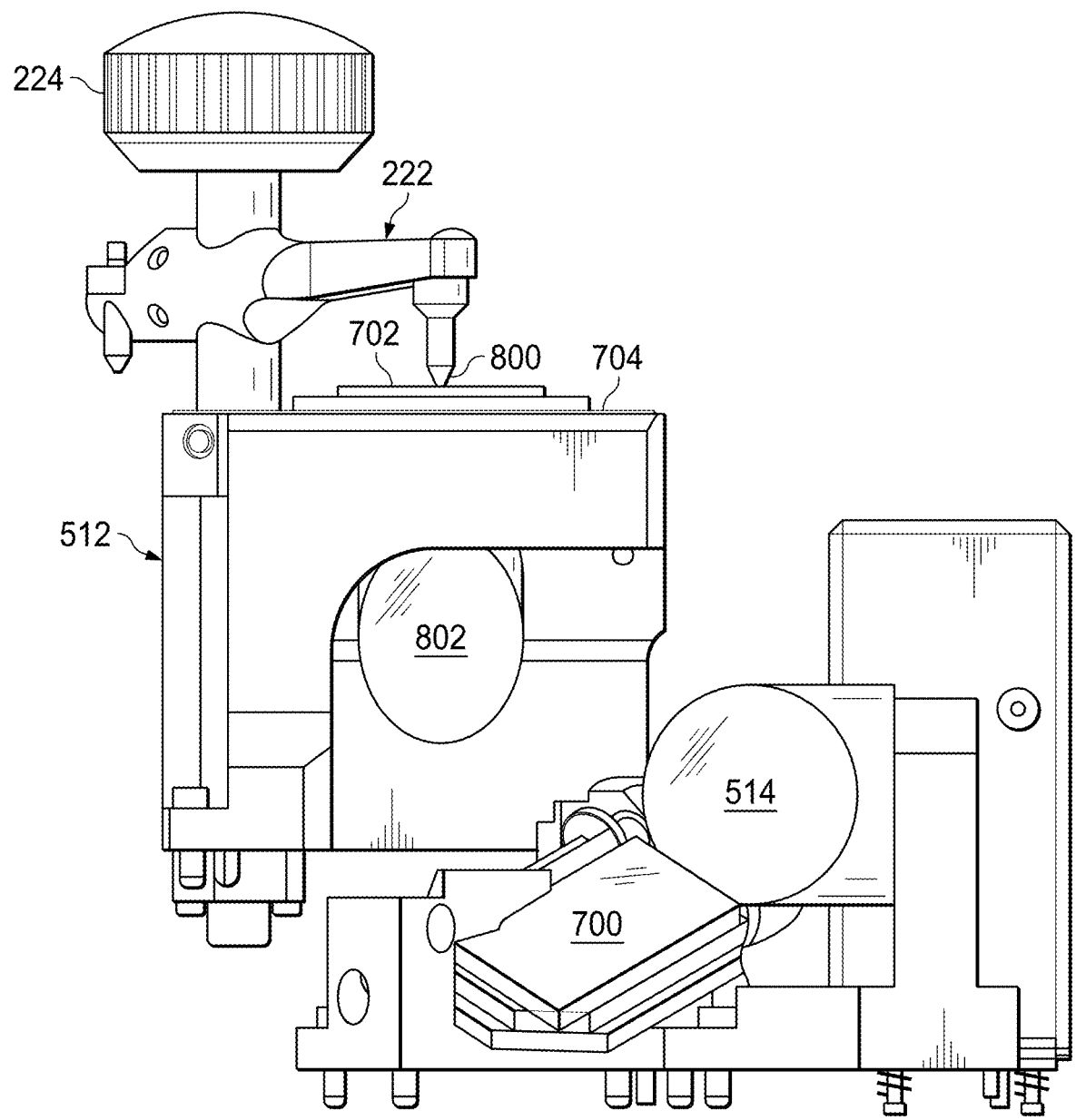
FIG. 8 depicts a left side view of the ATR compartment of FIG. 7 in accordance with an illustrative embodiment.
Figure 9:
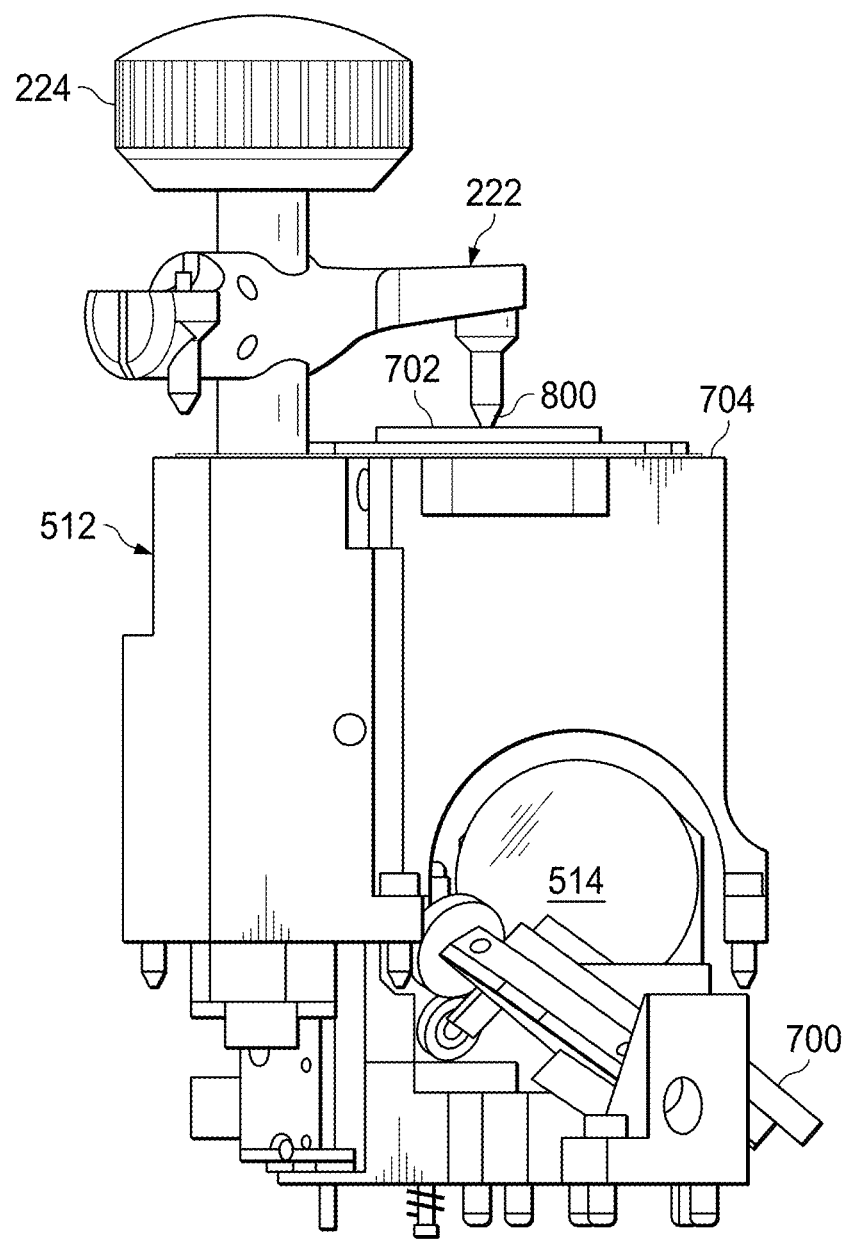
FIG. 9 depicts a back view of the ATR compartment of FIG. 7 with a flipper mirror in a down position in accordance with an illustrative embodiment.
Figure 10:
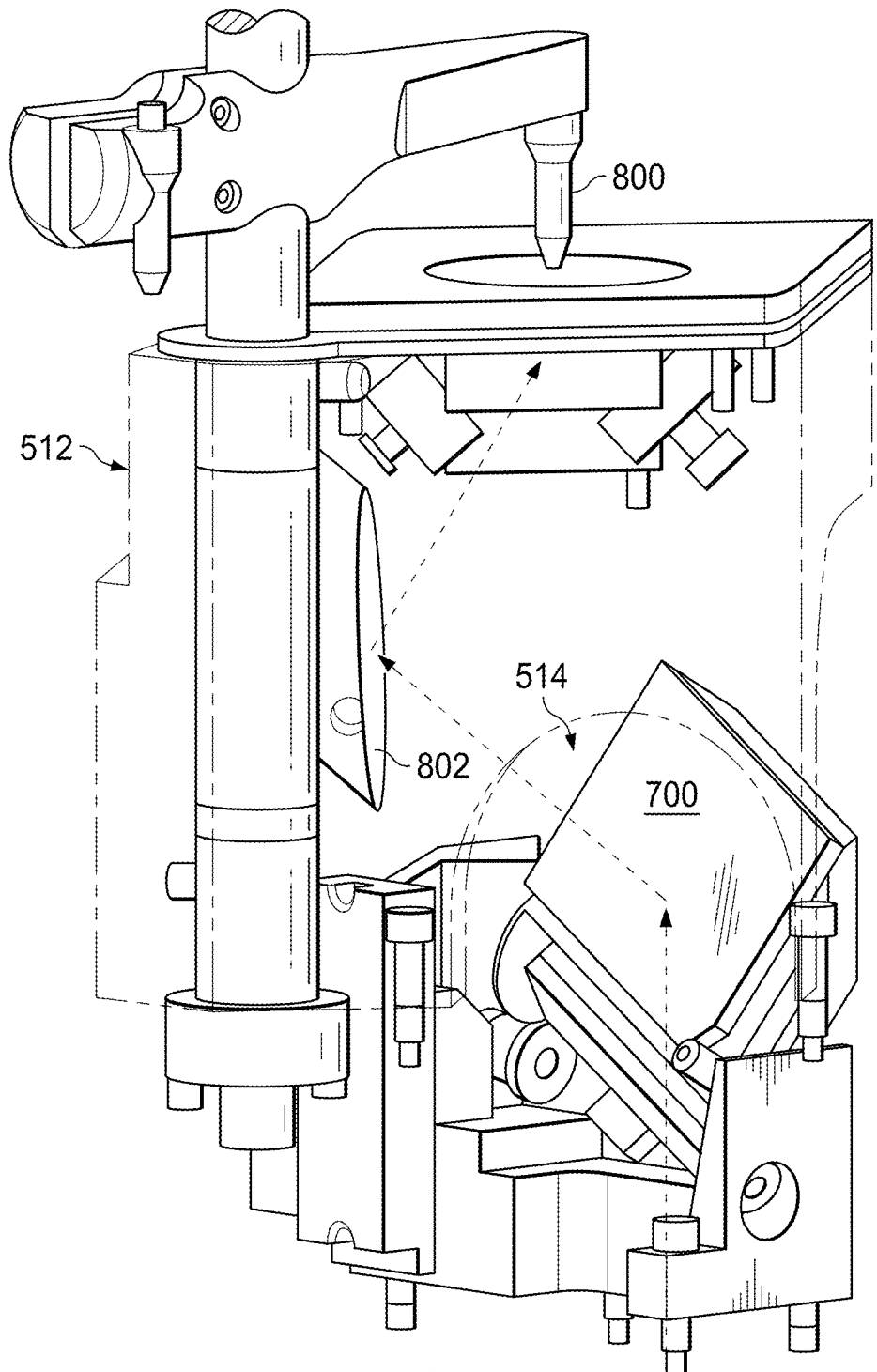
FIG. 10 depicts a back view of the ATR compartment of FIG. 7 with a flipper mirror in an up position in accordance with an illustrative embodiment.

With reference to FIG. 8, a left side view of ATR 512 with flipper mirror 700 down is shown in accordance with an illustrative embodiment. ATR 512 further includes an ATR tip 800 (shown with reference to FIG. 8) extending from ATR arm 222 and an optical element 802. In an illustrative embodiment, optical element 802 is a parabolic mirror. With reference to FIG. 9, a back view of ATR 512 with flipper mirror 700 down is shown in accordance with an illustrative embodiment. With reference to FIG. 10, a back view of ATR 512 with flipper mirror 700 up is shown in accordance with an illustrative embodiment.

Figure 11:
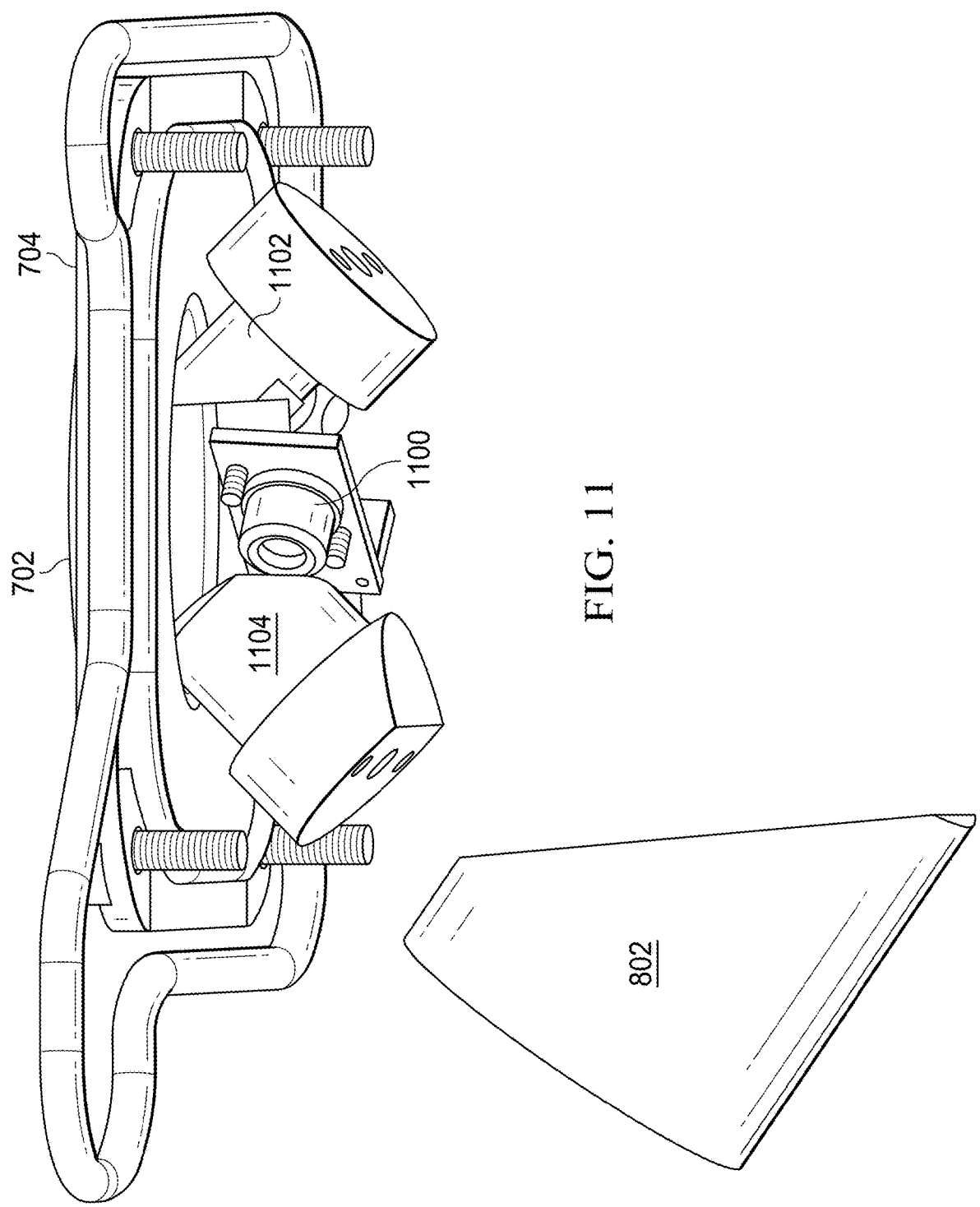
FIG. 11 depicts a back bottom perspective view of components of the ATR compartment of FIG. 7 in accordance with an illustrative embodiment.
Figure 12:
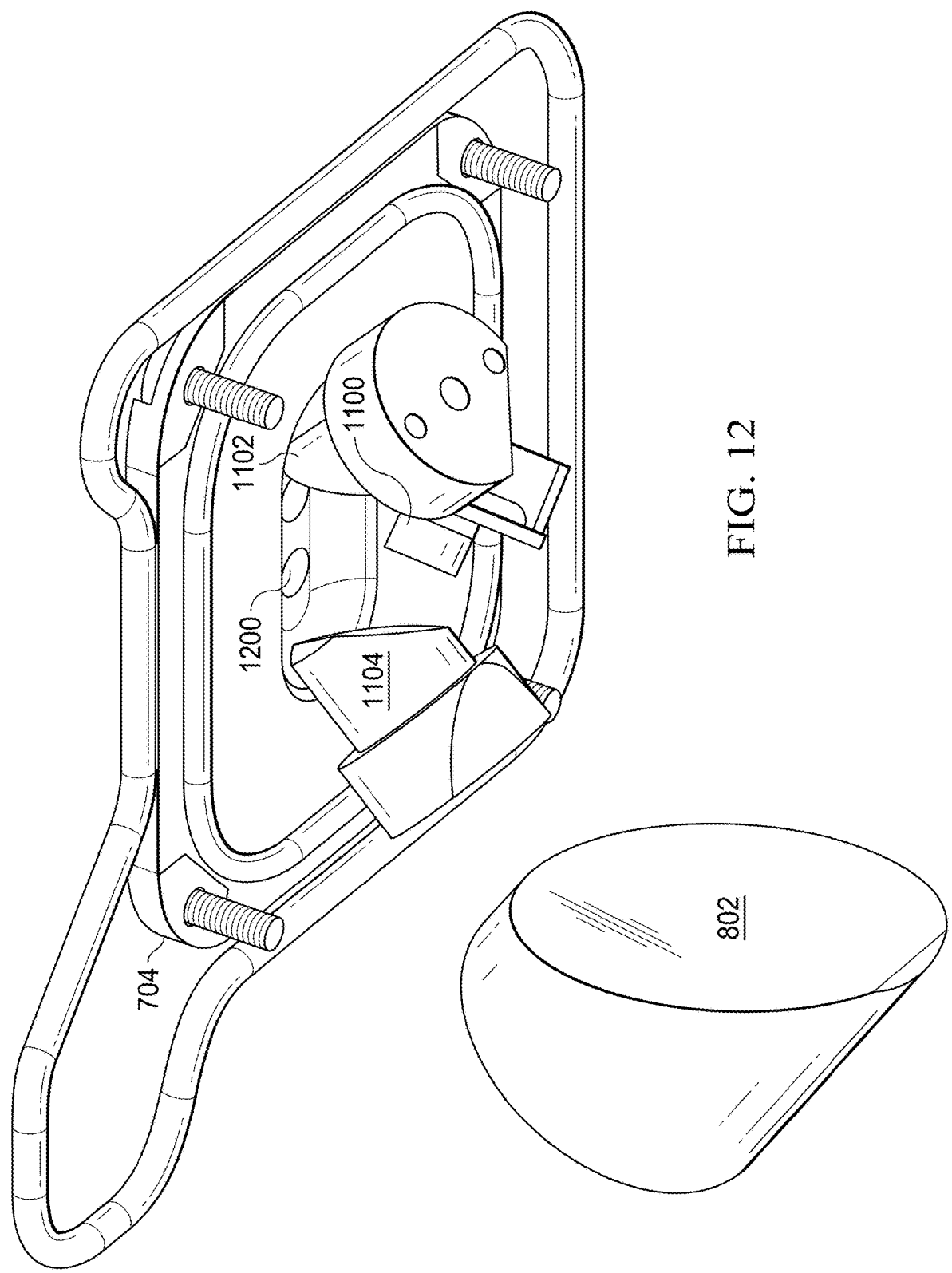
FIG. 12 depicts a left side bottom perspective view of components of the ATR compartment of FIG. 7 in accordance with an illustrative embodiment.

With reference to FIG. 11, a back bottom perspective view of additional components of ATR 512 is shown in accordance with an illustrative embodiment. With reference to FIG. 12, a left side bottom perspective view of the additional components of ATR 512 is shown in accordance with an illustrative embodiment. ATR 512 further includes a first optical element 1102 and a second optical element 1104. In an illustrative embodiment, first optical element 1102 and second optical element 1104 are elliptical mirrors.

To use ATR 512, a user may rotate ATR arm 222 away from ATR puck 702 and place a sample in either liquid or solid form on or in ATR puck 702. For example, the user may use a pipette to place a drop of the sample on ATR puck 702. The user may rotate ATR arm 222 toward ATR puck 702 after placement of the drop on ATR puck 702. The user may then rotate ATR knob 224 to press the sample between ATR tip 800 and an upper surface of ATR puck 702 so that the crystal adequately contacts the sample as understood by a person of skill in the art. One or more of these operations may be automated.

After depression of button 106, filtered light 548 is directed onto flipper mirror 700 positioned in the up position. An actuator is mounted to flipper mirror 700 to lower and raise flipper mirror 700 between a first down position as shown in FIG. 9 and a second up position as shown in FIG. 10. In the first position, flipper mirror 700 does not receive filtered light 548, which is instead received by optical element 514 which reflects filtered light 548 into accessory compartment 300 to form light beam 516. In the second position, flipper mirror 700 is positioned to receive filtered light 548 and to reflect the received filtered light 548 toward optical element 802 and the crystal such that optical element 514 does not receive filtered light 548 or light beam 516.

Optical element 802 receives light reflected from flipper mirror 700 and reflects the received light toward first optical element 1102. First optical element 1102 receives light reflected from optical element 802 and reflects the received light toward a lower surface 1200 (shown with reference to FIG. 12) of ATR puck 702. ATR puck 702 is formed of an optically dense crystal with a high refractive index at a certain angle. This internal reflectance creates an evanescent wave that extends beyond the surface of the crystal and into the sample held in contact with the crystal. This evanescent wave protrudes a few microns beyond the crystal surface and into the sample. In regions of the infrared spectrum where the sample absorbs energy, the evanescent wave is attenuated or altered. The attenuated energy from the evanescent wave exits the opposite end of the crystal and is received by second optical element 1104, which reflects the received light toward ATR detector 1100. ATR detector 1100 receives the reflected light from second optical element 1104. ATR detector 1100 converts the received light into an electrical signal indicating an intensity of the evanescent wave.

In an illustrative embodiment, ATR detector 1100 includes a DLaTGS detector element, a window permitting the light to approach the DLaTGS detector element, and electronics to power the DLaTGS detector element, and to extract the signal information. The window both protects the DLaTGS detector element and is transparent over the desired spectral range. Typically, to perform multi-range IR two detectors are needed: one for the MIR (potassium bromide (KBr) window) and one for the FIR (polyethylene window). In an illustrative embodiment, the window of ATR detector 1100 is a diamond window, which allows a wide spectral range of data collection, from the FIR to the MIR, with one detector, and eliminates the need to swap detectors or insert an additional mirror. Further, the diamond window is not susceptible to moisture damage.

As previously described, the accessory compartment 300 is configured to receive a variety of sample analysis accessory devices. The optical element 514 receives the filtered light 548, which is a collimated light. The optical element 514 then focuses the filtered light 548 into light beam 516 for use by a sample analysis accessory device in the accessory compartment 300. However, the focused light beam 516 is not suitable for AT measurements. Use of the accessory compartment 300 for AT measurements would require the replacement of at least the optical element 514 to a flat mirror to maintain the collimated light beam into the accessory compartment 300. However, this replacement hinders the use of the accessory compartment 300 for other applications.

Accordingly, FIG. 5B provides a top view of spectrometer 102 having the ATR 512 and ATR arm 222 replaced with the AT device 250. Accordingly, the AT device 250 directly receives the filtered light 548 that is collimated. The filtered light 548 travels through the AT device 250 and to the optical element 514, which focuses the filtered light 548 into the light beam 516 provided to the accessory compartment 300. In this manner, the primary internal optics of the spectrometer 102 remain the same, while only the ATR 512 is replaced to provide for the AT device 250. In some instances, the AT device 250 fits into the space previously occupied by the ATR 512 such that no further changes are necessary for the construction of the spectrometer 102. Furthermore, as only the AT device 250 needs to be installed to obtain AT measurements, the accessory compartment (full sample space) remains available for other accessories that may be useful with the AT device 250.

Figure 13:
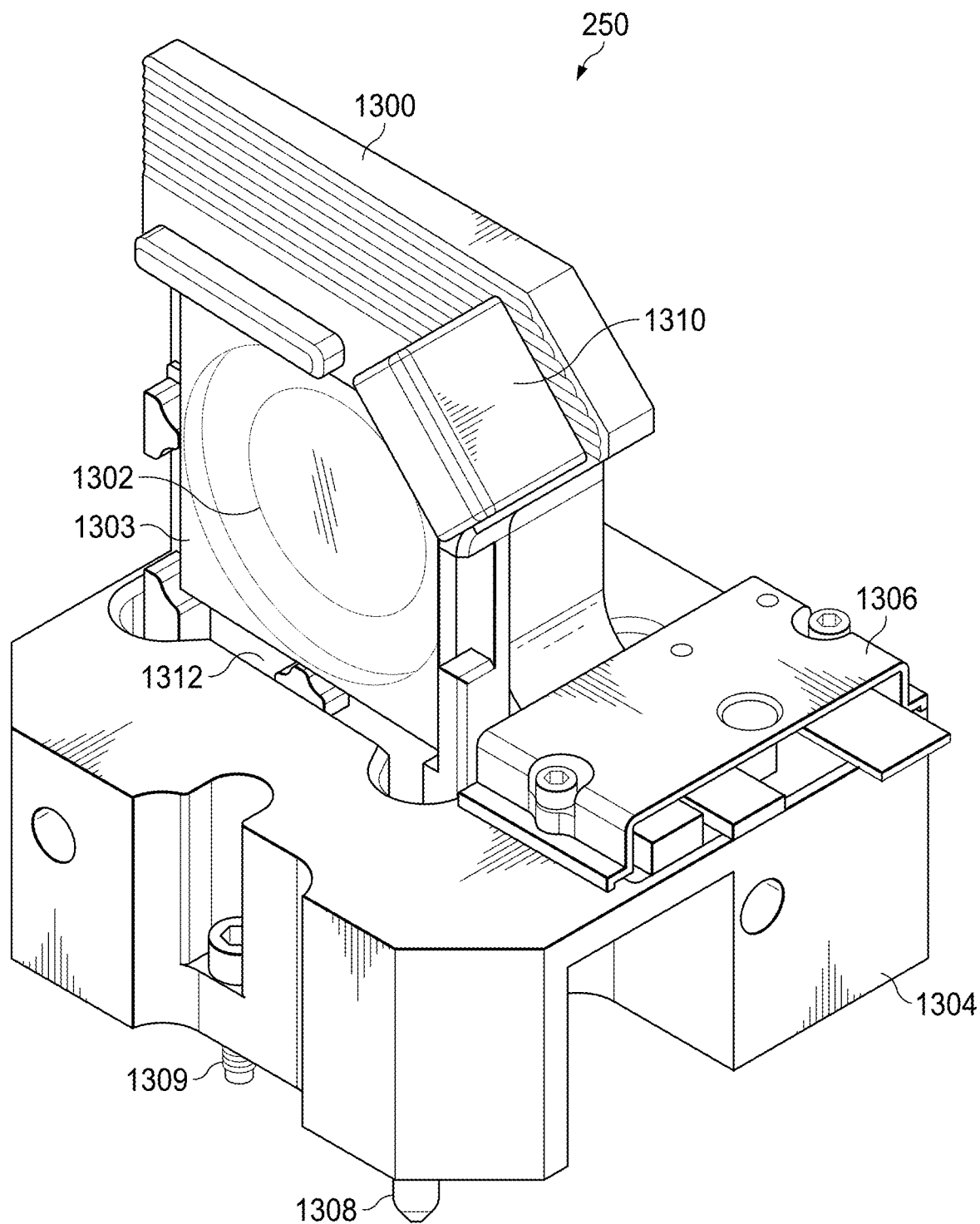
FIG. 13 depicts a perspective view of an example AT device and sample holder in accordance with an illustrative embodiment.
Figure 14:
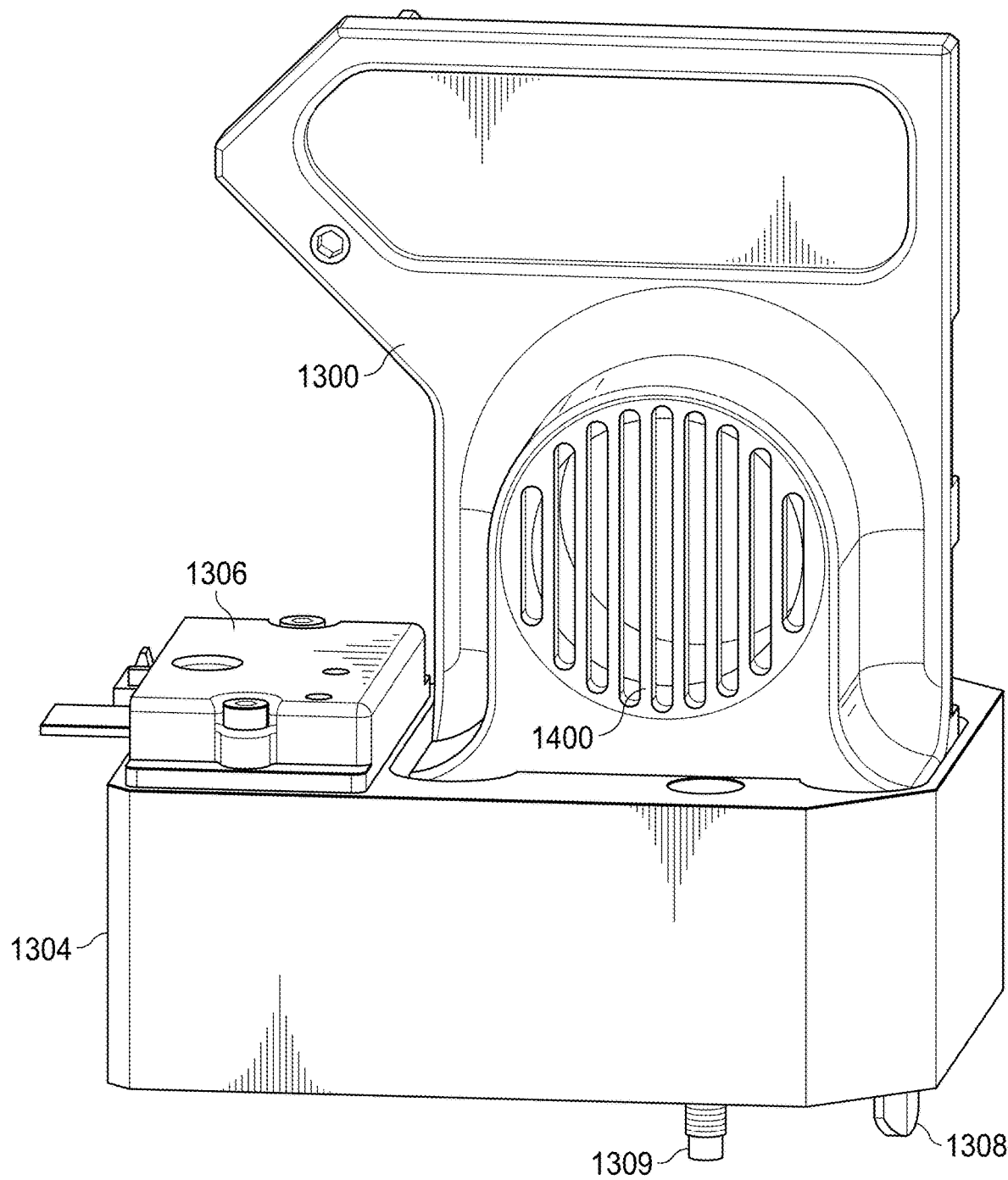
FIG. 14 depicts another perspective view of the example AT device and sample holder of FIG. 13.

FIGS. 13-14 illustrate an example AT device 250 for preforming AT measurements. The AT device 250 includes a sample holder 1300 configured to hold a sample 1302. In some implementations, a filter 1303 covers the sample 1302. The sample holder 1300 includes a latching device 1310 (e.g., clamps) to secure the sample 1302 to the sample holder 1300. In the example of FIGS. 13-14, the sample 1302 is a circle having a two-inch diameter. A user of the AT device 250 may adjust the latching device 1310 to remove and replace the sample 1302. In some instances, the filter 1303 is also secured by the latching device 1310. Accordingly, the filter 1303 may be removed or replaced when the latching device 1310 is adjusted. While only a single latching device 1310 is illustrated, in some instances, the AT device 250 includes more than one latching device 1310 to secure the sample 1302 to the sample holder 1300. The filter 1303 is configured to alter a characteristic of the filtered light 548 traveling through the sample 1302 such that the AT of the light is measured optically downstream form the AT device 250.

The sample holder 1300 is removably connected to an accessory base 1304 via an insertion slot 1312. In some instances, when inserted, the sample holder 1300 may be secured to (e.g., supported by) the accessory base 1304 via the insertion slot 1312. In some implementations, the insertion slot 1312 includes a magnet (not shown) configured to provide a magnetic force on the sample holder 1300, thereby securing the sample holder 1300 within the insertion slot 1312. The accessory base 1304 may then be coupled to the base plate 500 via one or more alignment devices 1308 and one or more fasteners 1309 (e.g., screws). For example, the one or more alignment devices 1308 may be inserted into corresponding holes (not shown) in the base plate 500. When the one or more alignment devices 1308 are inserted into their respective holes, the one or more fasteners 1309 are fastened to secure the accessory base 1304 to the base plate 500. In this manner, the sample holder 1300 may be removed from the accessory base 1304 and replaced without removal of the accessory base 1304 from the base plate 500.

Figure 15:
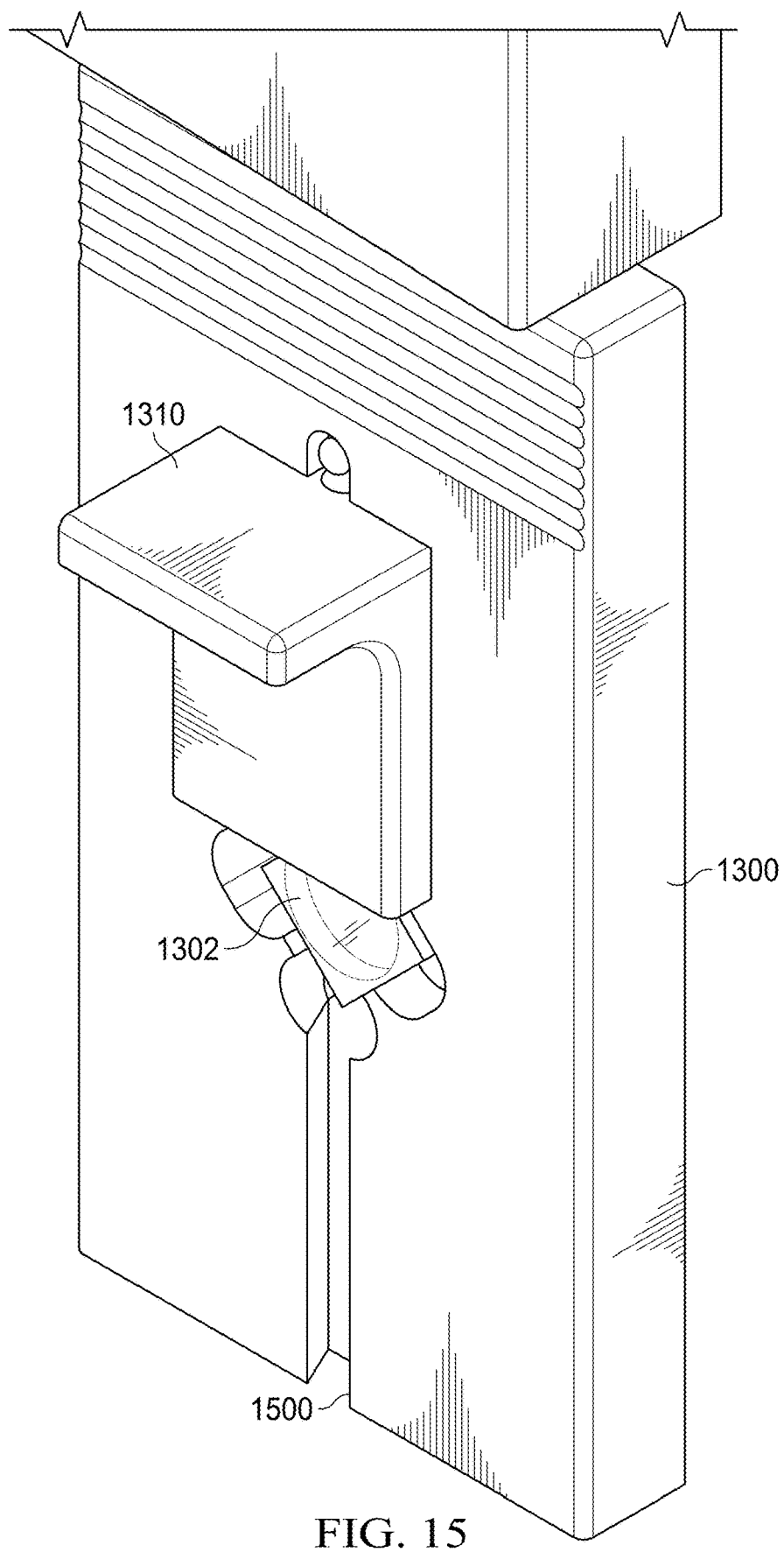
FIG. 15 depicts a perspective view of a sample holder in accordance with an illustrative embodiment.
Figure 16:
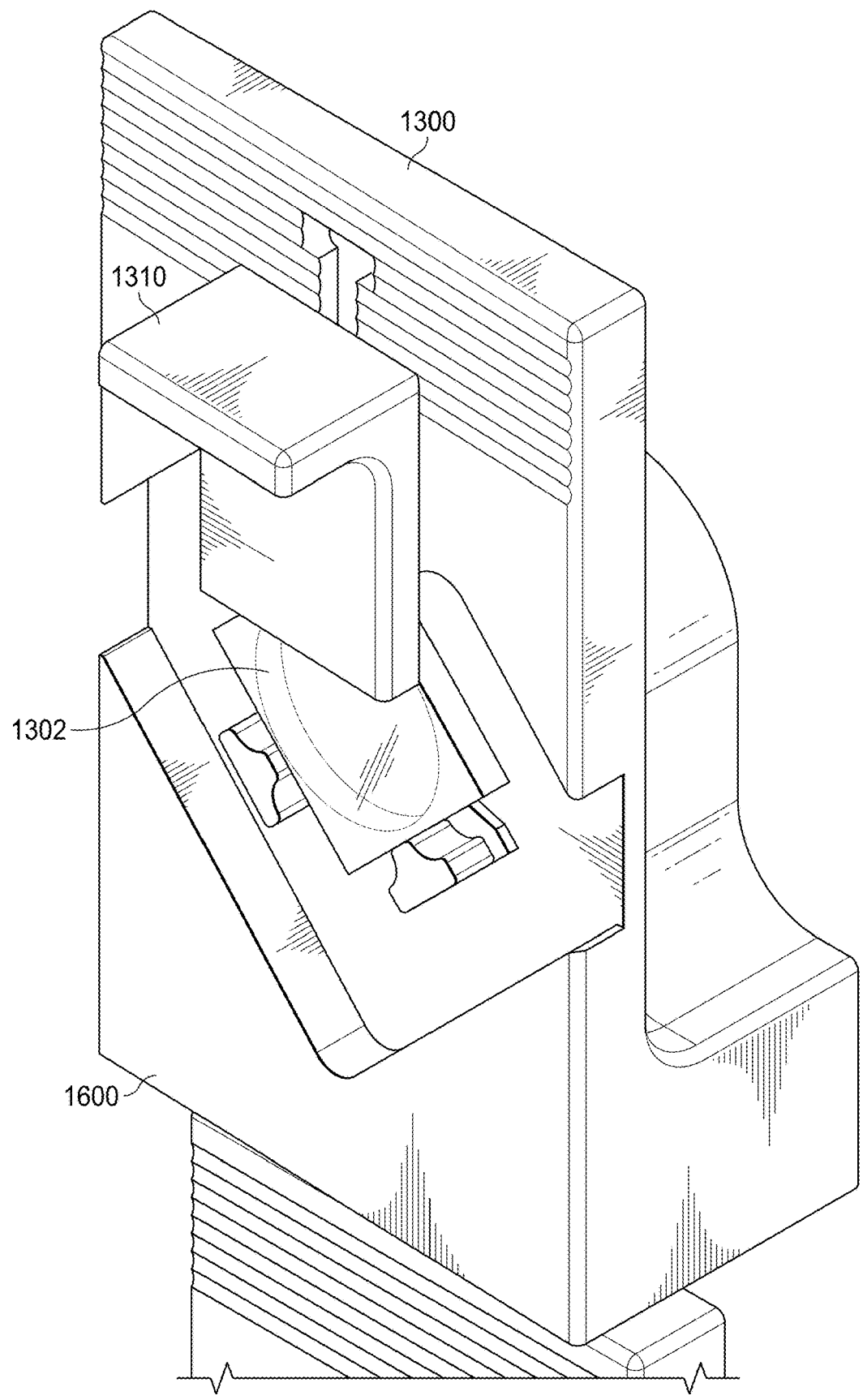
FIG. 16 depicts a perspective view of a sample holder in accordance with another illustrative embodiment.

FIGS. 15-16 illustrate additional sample holders 1300 that may be inserted into the insertion slot 1312. Each of the sample holders 1300 illustrated in FIGS. 13-16 may have different shapes or configurations for holding samples 1302 of different sizes. However, the sample holders 1300 and samples 1302 have same reference numbers for simplicity. In the example of FIG. 15, the sample holder 1300 includes a bottom portion 1500 inserted into the insertion slot 1312. The sample holder 1300 includes a sample 1302 configured as a square having a one-inch area. In the example of FIG. 16, the sample holder 1300 includes a bottom portion 1600 inserted into the insertion slot 1312. The sample holder 1300 includes a sample 1302 configured as a circle having a one-inch diameter.

With reference to FIGS. 13-14, the AT device 250 includes an AT detector 1306 (e.g., a detector device) connected to the accessory base 1304 for identifying when the sample holder 1300 is inserted into the accessory base 1304. The AT detector 1306 may be connected to the processor 118 such that, when a sample holder 1300 is inserted into the accessory base 1304, the AT detector 1306 transmits a signal to the processor 118 indicative of the insertion. The processor 118 may then select software included in the control application 114 related to AT measurements. In other implementations, the AT detector 1306 detects when the accessory base 1304 is coupled to the base plate 500. When the accessory base 1304 is coupled to the base plate 500, the AT detector 1306 transmits a signal to the processor 118 indicative of the insertion.

As the sample 1302 held by the sample holder 1300 may vary in shape and size, an aperture (not shown) may be provided to direct the filtered light 548 (collimated) through the sample 1302 while blocking light that would pass the sides of the sample holder 1300. The aperture may be configured to have a same size and shape as the sample 1302. In some instances, the aperture is connected to the accessory base 1304. In other instances, the aperture is connected to the base plate 500 and is situated between the AT device 250 and the optical element 542.

Figure 17:
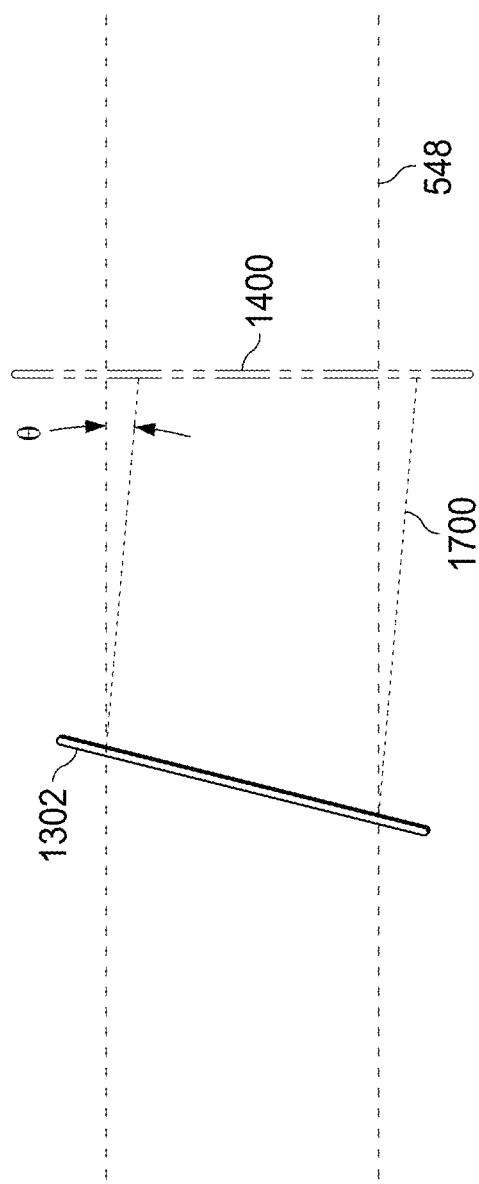
FIG. 17 depicts a top view of the sample holder of FIGS. 13-14 in accordance with an illustrative embodiment.

In some instances, a small portion of the filtered light 548 that travels through the sample 1302 is reflected by the sample 1302. This reflected light travels back toward the optical element 542 and may re-enter the interferometer 538. This reflected light may result in a double modulation of the light 544 and filtered light 548, impacting the validity of data encoded by the interferometer 538 into the light 544. To address this reflected light, in some embodiments, the sample holder 1300 includes a screen 1400 having a plurality of columns (shown with respect to FIG. 14) to block the portion of light reflected by the sample 1302. The sample 1302 is situated within the sample holder 1300 at an angle such that light reflected by the sample 1302 is blocked by the plurality of columns. For example, as shown in FIG. 17, the sample 1302 is situated at an angle θ with respect to the plurality of columns 1400 such that the sample 1302 is on a plane aslant to an axis along which the filtered light 548 travels. As the filtered light 548 (indicated by dashed lines) travels through the sample 1302, a portion of the filtered light 548 is reflected as a reflected light 1700 (indicated by dotted lines). However, because the sample 1302 is tilted, the filtered light 548 travels at the angle Θ and is blocked by the plurality of columns 1400. The angle Θ may be, for example, approximately 3°-5°.

Figure 18:
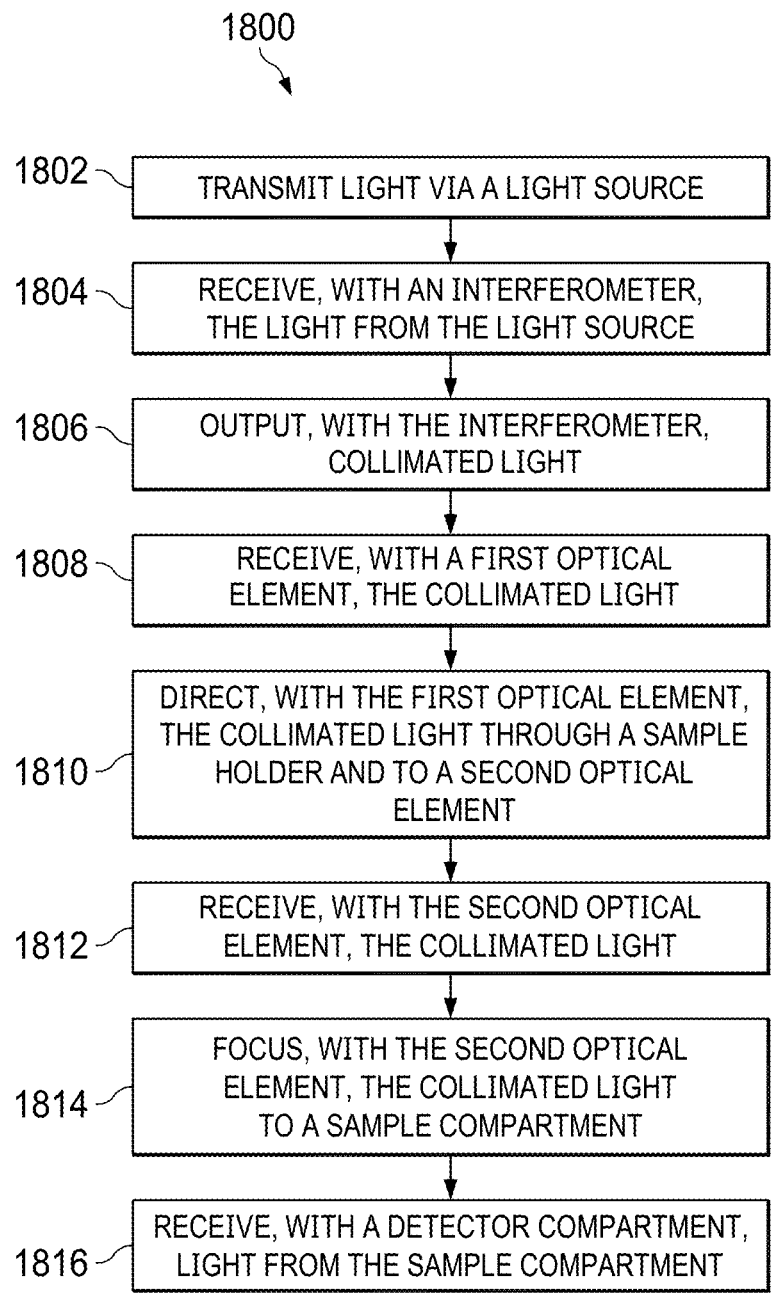
FIG. 18 depicts a block diagram of a method in accordance with an illustrative embodiment.

FIG. 18 illustrates an example method 1800 performed by the spectrometry system 100. Method 1800 is merely one example of the travel of light through the spectrometer 102. Additional methods of operating the spectrometer 102 are also possible. The method 1800 is described primarily with reference to FIG. 5B.

At step 1802, the method 1800 includes transmitting light via the light source (e.g., either the first light source 520 or the second light source 522). At step 1804, the method 1800 includes receiving, with the interferometer 538, the light from the light source. Additional optics may steer the light from the light source to the interferometer 538. At step 1806, the method 1800 includes outputting, with the interferometer 538, a collimated light. The collimated light may also be modulated. At step 1808, the method 1800 includes receiving, with a first optical element, the collimated light. For example, the optical element 542 receives light from the interferometer 538.

At step 1810, the method 1800 includes directing, with the first optical element, the collimated light through a sample holder and to a second optical element. For example, when the AT device 250 is coupled to the base plate 500, the optical element 542 steers the light 544 (or filtered light 548) through the AT device 250 and towards the optical element 514. At step 1812, the method 1800 includes receiving, with the second optical element, the collimated light. For example, the optical element 514 receives the filtered light 548.

At step 1814, the method 1800 includes focusing, with the second optical element, the collimated light to a sample compartment. For example, the optical element 514 focuses the filtered light 548 into a light beam 516 directed through the accessory compartment 300 and towards the detector compartment. At step 1816, the method 1800 includes receiving, with the detector compartment, light from the sample compartment. For example, a light beam 510 exits the accessory compartment 300 and travels towards the first detector 504, the second detector 506, and/or the third detector 508.

Various components of spectrometer 102 may be operably coupled to processor 118 to receive information from processor 118 and/or to send information to processor 118 under control of control application 114. For example, processor 118 is operably coupled to the light source to control the switching on or off of the one or more light sources. Processor 118 also may be operably coupled to first detector 504, second detector 506, third detector 508, Raman detector 524, ATR detector 1100, and AT detector 1306 to receive the electrical signals generated by each detector. Processor 118 further may be operably coupled to the referenced actuators to control movement of the various described optical elements and to open and close purge shutters mounted in one or more walls of accessory compartment 300. For example, purge shutters may be mounted to cover second light port 308 and third light port 404 so that an interior of spectrometer 102 can be purged as understood by a person of skill in the art. Processor 118 further may be operably coupled to interferometer 538, validation wheel 546, and/or aperture device 528 to control their operation.

Figure 19:
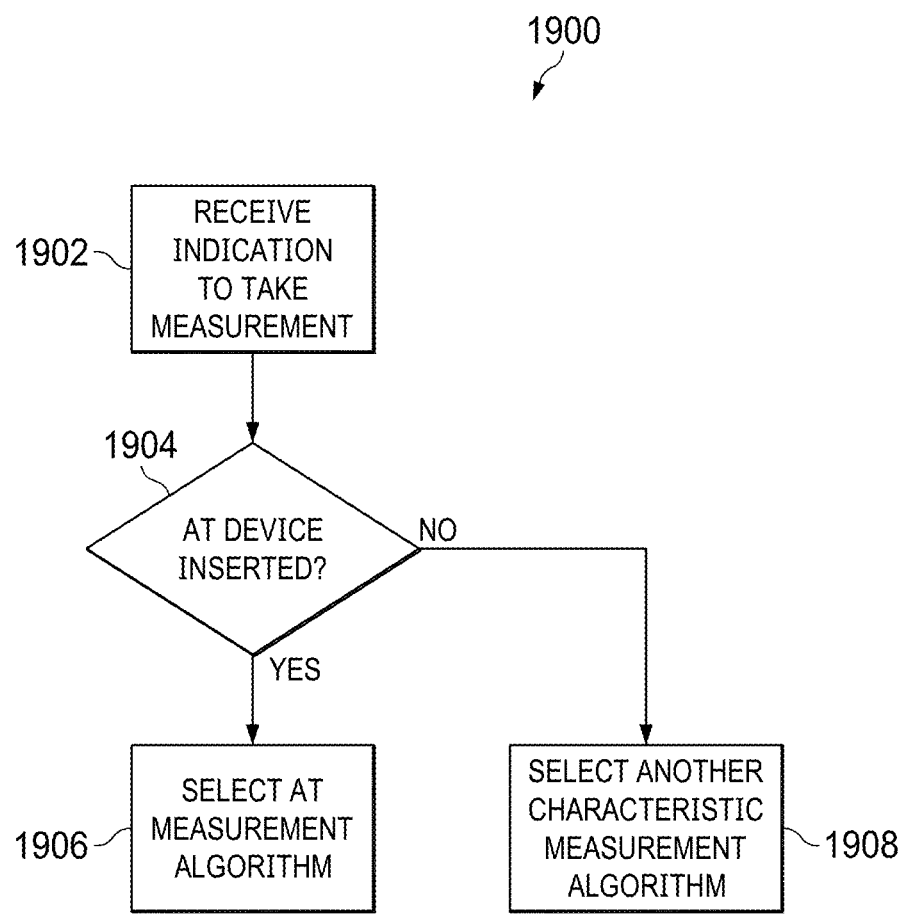
FIG. 19 depicts a block diagram of another method in accordance with an illustrative embodiment.

Additionally, the processor 118 may be configured to select measurement algorithms based on devices inserted into the spectrometer 102. FIG. 19 illustrates an example method 1900 performed by the processor 118 for controlling measurements of the spectrometer 102. At step 1902, the processor 118 receives an indication to take a measurement. For example, the processor 118 detects actuation of the button 106, thereby initiating a measurement sequence. In some instances, the processor 118 receives the indication from the input interface 104.

At step 1904, the processor 118 determines whether the AT device 250 is inserted. For example, in some embodiments, as described above, the AT detector 1306 transmits a signal to the processor 118 when the AT device 250 is inserted into the spectrometer 102. The processor 118 may use such a received signal to select and set an operating mode of the spectrometer 102. For example, when the processor 118 receives the signal from the AT detector 1306, the processor 118 determines the AT device 250 is inserted ("YES" at step 1904) and proceeds to step 1906. When the processor 118 does not receive a signal from the AT detector 1306, the processor 118 determines the AT device 250 is not inserted ("NO" at step 1904) and proceeds to step 1908.

When the AT device 250 is inserted, at step 1906 the processor 118 selects an AT measurement algorithm. For example, the processor 118 operates in the first operating mode and implements an algorithm included in the control application 114 for measuring the AT of the sample 1302 held by the sample holder 1300. When the AT device 250 is not inserted, at step 1908 the processor 118 operates in a second operating mode and selects another characteristic measurement algorithm. For example, the processor 118 implements an algorithm associated with an accessory inserted in the accessory compartment 300. In some instances, the processor 118 implements an algorithm associated with the ATR 512. In some implementations, the processor 118 automatically selects an algorithm for measurements as the AT device 250 is inserted into or removed from the spectrometer 102.

Embodiments described herein primarily relate to a spectrometer 102 having a replaceable ATR 512 and AT device 250. However, the AT device 250 may be implemented in other spectrometers not configured to receive an ATR 512. Additionally, the AT device 250 may be implemented in spectrometers configured to receive both the ATR 512 and the AT device 250 simultaneously. In such an implementation, the ATR 512 may be installed optically downstream from the AT device 250, where both devices receive collimated light (e.g., the filtered light 548). In spectrometers having different optical configurations than those described with respect to FIGS. 5A-5B, the AT device 250 may be installed in a location having an appropriate collimated light and, as compared to other accessory devices, may leave the original sample compartment, accessory compartment, or both available for use and may be used to obtain AT measurements without requiring modification to existing optics of the spectrometer. For example, in some embodiments, the AT device 520 may be installed in a spectrometer that does not include the ATR 512 but includes a sample compartment (which may be a primary sample compartment or an accessory compartment) and, in such an embodiment, the AT device 520 is installed optically downstream of a collimated light source (e.g., prior to any subsequent redirecting or focusing by other optical elements included in the spectrometer), such that collimated light is directed to a sample held via the AT device 520 and light exiting the sample is directed to the detector compartment of the spectrometer using existing optical elements of the spectrometer.

The word "illustrative" is used herein to mean serving as an example, instance, or illustration. Any aspect or design described herein as "illustrative" is not necessarily to be construed as preferred or advantageous over other aspects or designs. Further, for the purposes of this disclosure and unless otherwise specified, "a" or "an" means "one or more". Still further, the use of "and" or "or" is intended to include "and/or" unless specifically indicated otherwise.

The foregoing description of illustrative embodiments of the invention has been presented for purposes of illustration and of description. It is not intended to be exhaustive or to limit the invention to the precise form disclosed, and modifications and variations are possible in light of the above teachings or may be acquired from practice of the invention. The embodiments were chosen and described in order to explain the principles of the invention and as practical applications of the invention to enable one skilled in the art to utilize the invention in various embodiments and with various modifications as suited to the particular use contemplated. It is intended that the scope of the invention be defined by the claims appended hereto and their equivalents.

Various features and advantages of the embodiments described herein are set forth in the following claims.

What is claimed is:

1. A spectrometer system comprising:
    a base plate;
    a light source configured to transmit light;
    an interferometer mounted to the base plate, wherein the interferometer is configured to receive the light from the light source and output modulated light;
    a first optical element configured to receive the modulated light and direct the modulated light towards a second optical element, wherein the second optical element focuses the modulated light to a sample compartment;
    a detector compartment including one or more detectors, the detector compartment is configured to receive the modulated light from the sample compartment; and
    a sample holder coupled to the base plate between the first optical element and the second optical element, wherein the modulated light is directed to the sample holder via the first optical element, and light exiting the sample holder is directed through the sample compartment and to the detector compartment via the second optical element.

2. The spectrometer system of claim 1, wherein the modulated light output by the interferometer is collimated.

3. The spectrometer system of claim 1, wherein the sample holder includes:
    an accessory base; and
    a sample supported by the accessory base, and wherein the modulated light travels along a first axis, and wherein the sample is defined by a plane aslant to the first axis.

4. The spectrometer system of claim 3, wherein the sample holder includes a screen including a plurality of columns, wherein a portion of the modulated light reflects off the sample compartment as a reflected light, and wherein the plurality of columns are configured to receive the reflected light.

5. The spectrometer system of claim 2, wherein the sample compartment is configured to hold a second sample, and wherein, when the sample holder is removed from the base plate, the modulated light is directed by the second optical element through the second sample held by the sample compartment.

6. The spectrometer system of claim 2, wherein the accessory base includes one or more fasteners configured to couple the accessory base to the base plate.

7. The spectrometer system of claim 2, wherein the sample holder further includes a detector device to detect coupling of the sample holder to the base plate.

8. The spectrometer system of claim 2, wherein the sample holder includes an aperture configured to direct light toward the sample.

9. The spectrometer system of claim 1, wherein the one or more detectors are configured to detect a characteristic of the light exiting the sample holder, the characteristic usable to determine an absolute transmission of a sample held by the sample holder.

10. The spectrometer system of claim 1, wherein the sample holder is removably coupled to the base plate, and wherein the modulated light is directed to the sample holder when the sample holder is coupled to the base plate.

11. The spectrometer system of claim 1, wherein the modulated light is infrared (IR) light.

12. The spectrometer system of claim 1, further comprising:
a removable cover plate configured to provide access to the sample holder.

13. The spectrometer system of claim 1, wherein the one or more detectors includes at least one selected from a group consisting of a deuterated triglycine sulfate detector, a deuterated, L-alanine doped triglycine sulfate detector, and a nitrogen-cooled mercury-cadmium-telluride detector.

14. The spectrometer system of claim 1, further comprising a display configured to provide the absolute transmission of the sample.

15. A method for operating a spectrometer system, the method comprising:
transmitting a light via a light source;
receiving, with an interferometer, the light from the light source;
outputting, with the interferometer, a modulated light;
receiving, with a first optical element, the modulated light; and
in a first mode of operation of the spectrometer system:
directing, with the first optical element, the modulated light through a sample holder holding a sample, wherein the sample holder is situated between the first optical element and a second optical element;
focusing, with the second optical element, the modulated light to a sample compartment; and
receiving, with a detector compartment including one or more detectors, light from the sample compartment.

16. The method of claim 15, further comprising:
detecting, in the first mode of operation, with the one or more detectors, a characteristic of light exiting the sample holder; and
determining, in the first mode of operation, with an electronic processor, an absolute transmission of the sample held by the sample holder using the characteristic.

17. The method of claim 15, further comprising:
in the first mode of operation, directing, with an aperture, the modulated light toward the sample holder.

18. The method of claim 15, wherein the sample compartment includes a second sample, and wherein the method further includes:
focusing, in a second mode of operation of the spectrometer system, with the second optical element, the modulated light through the second sample held in the sample compartment.

19. The method of claim 15, further including:
detecting, with a detector device, coupling of the sample holder to a base plate; and
in response to detecting the coupling of the sample holder to the base plate, setting the spectrometer system to the first mode of operation.

20. The method of claim 19, further including:
detecting removal of the sample holder from the base plate; and
in response to detecting the removal of the sample holder from the base plate, setting the spectrometer system to the second mode of operation.

* * * * *